United States Patent
Matsui et al.

(10) Patent No.: US 10,263,654 B2
(45) Date of Patent: Apr. 16, 2019

(54) RADIO RECEIVER AND INTERMEDIATE FREQUENCY SELECTION METHOD

(71) Applicant: Renesas Electronics Corporation, Tokyo (JP)

(72) Inventors: Naohiro Matsui, Tokyo (JP); Hiroyuki Okada, Tokyo (JP); Kichung Kim, Tokyo (JP); Tomoaki Hirota, Tokyo (JP); Takahiro Sato, Tokyo (JP); Osamu Inagawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/889,945

(22) Filed: Feb. 6, 2018

(65) Prior Publication Data
US 2018/0294828 A1 Oct. 11, 2018

(30) Foreign Application Priority Data
Apr. 5, 2017 (JP) ................... 2017-075234

(51) Int. Cl.
*H04B 1/26* (2006.01)
*H04B 1/16* (2006.01)
(Continued)

(52) U.S. Cl.
CPC ......... *H04B 1/1638* (2013.01); *H04B 1/0007* (2013.01); *H04W 4/80* (2018.02)

(58) Field of Classification Search
CPC .................................................. H04B 1/1638
(Continued)

(56) References Cited

U.S. PATENT DOCUMENTS

| 6,954,628 B2 | 10/2005 | Minnis et al. |
| 7,590,205 B2 * | 9/2009 | Zipper ............... H04B 1/28 375/316 |

(Continued)

FOREIGN PATENT DOCUMENTS

JP   2004-515104 A   5/2004

OTHER PUBLICATIONS

Extended European Search Report dated Sep. 3, 2018 in European Application No. 18155512.9.
(Continued)

*Primary Examiner* — Sanh D Phu
(74) *Attorney, Agent, or Firm* — McGinn I.P. Law Group, PLLC.

(57) ABSTRACT

A radio frequency signal can be received in an intermediate frequency mode suitable for radio wave reception conditions. An oscillator has a variable oscillation frequency. A quadrature demodulator includes a frequency mixer and generates an intermediate frequency signal having an intermediate frequency lower than the frequency of the radio frequency signal. An ADC receives the intermediate frequency signal passed through an analog filter and converts the received intermediate frequency signal to a digital signal. A channel selection signal processing section generates a demodulated signal from the intermediate frequency signal converted to the digital signal. A mode control section switches the operating mode of the quadrature demodulator between a zero intermediate frequency mode and a low intermediate frequency mode in accordance with the radio wave reception conditions.

20 Claims, 23 Drawing Sheets

(51) Int. Cl.
*H04W 4/80* (2018.01)
*H04B 1/00* (2006.01)

(58) Field of Classification Search
USPC ...................................................... 455/196.1
See application file for complete search history.

(56) References Cited

U.S. PATENT DOCUMENTS

| | | |
|---|---|---|
| 2004/0058661 A1 | 3/2004 | Hsu et al. |
| 2006/0083335 A1* | 4/2006 | Seendripu .............. H03D 3/008 375/332 |
| 2009/0239489 A1 | 9/2009 | Kaczman et al. |
| 2015/0049666 A1* | 2/2015 | Montalvo ............. H04W 88/10 370/328 |

OTHER PUBLICATIONS

Ajay Balankutty et al., "A 0.6-V Zero-IF/Low-IF Receiver with Integrated Fractional-N Synthesizer for 2.4-GHz ISM-Band Applications," IEEE Journal of Solid-State Circuits, vol. 45, No. 3, Mar. 2010.

* cited by examiner

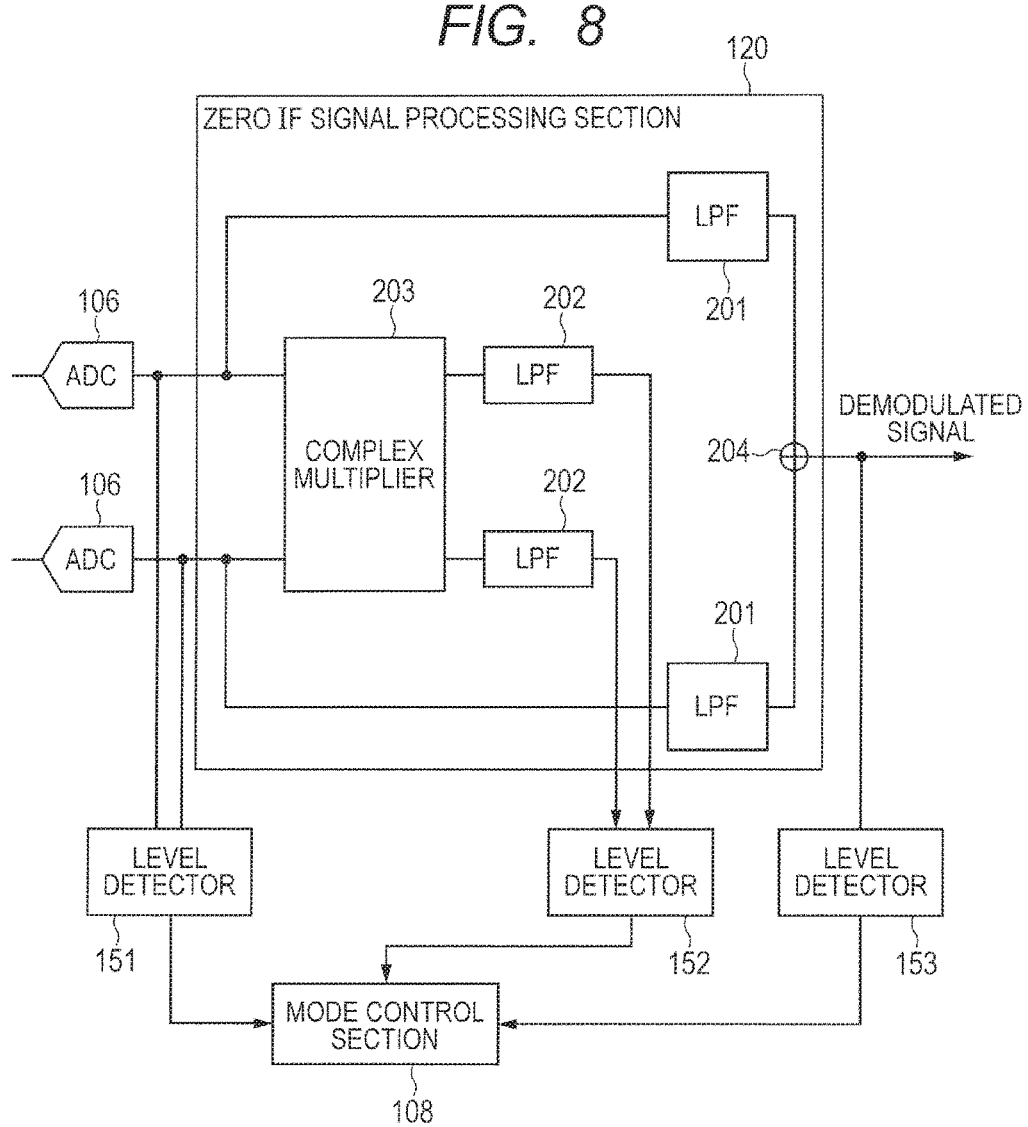

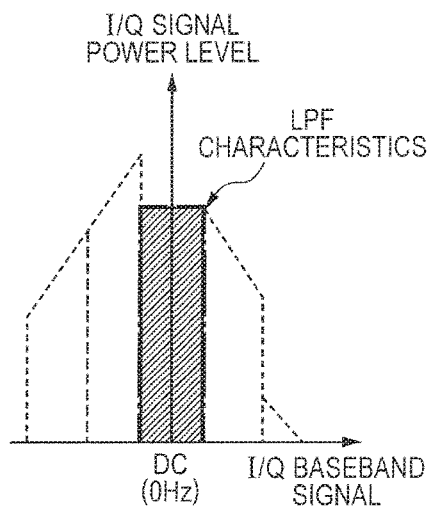 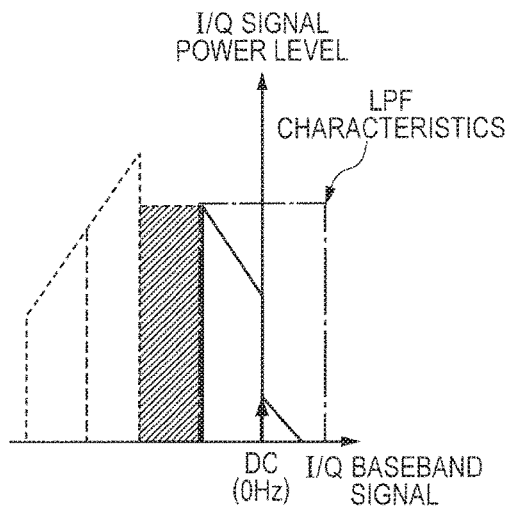
FIG. 9A
FIG. 9B

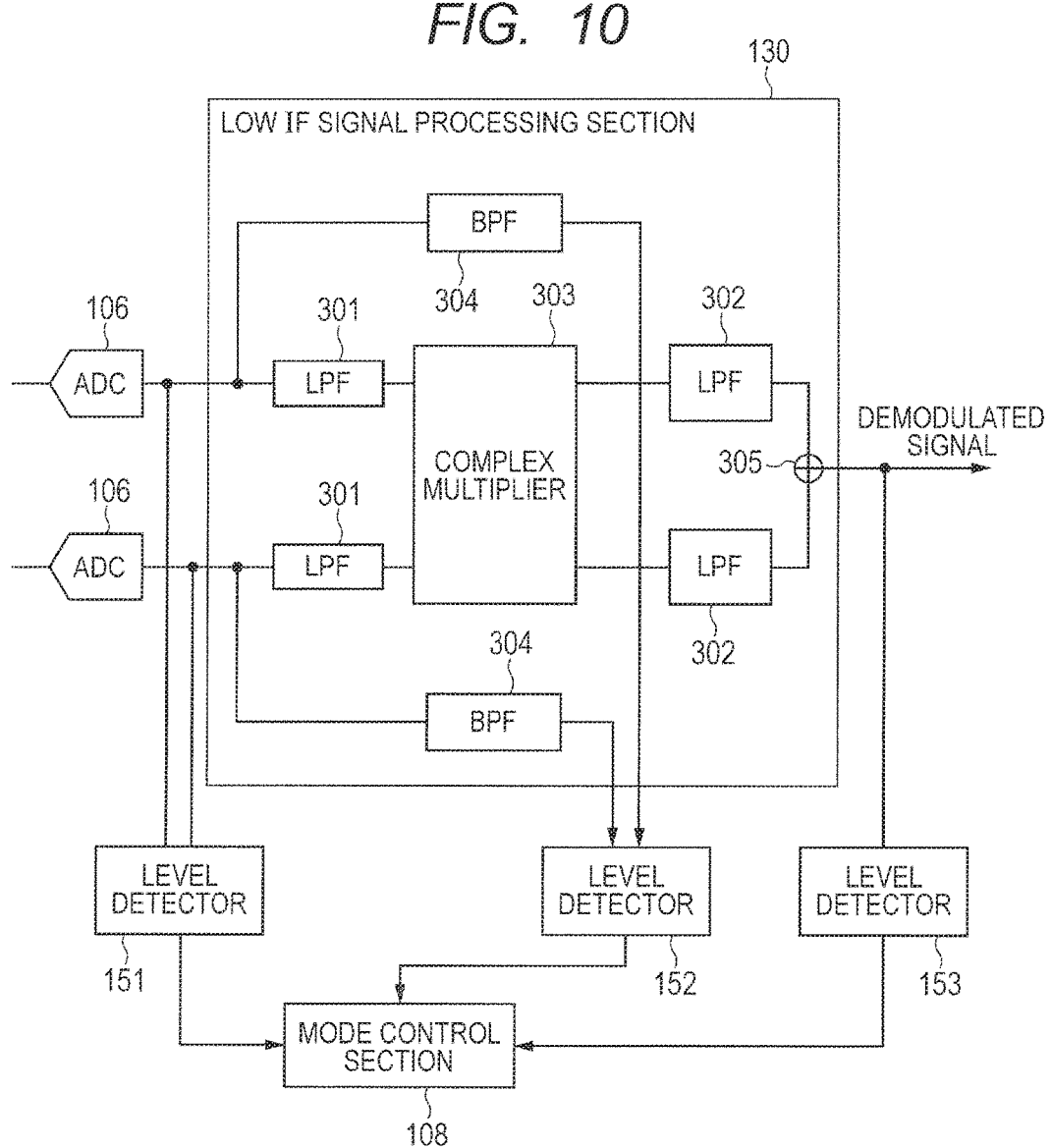

RADIO RECEIVER AND INTERMEDIATE FREQUENCY SELECTION METHOD

CROSS-REFERENCE TO RELATED APPLICATIONS

The disclosure of Japanese Patent Application No. 2017-075234 filed on Apr. 5, 2017 including the specification, drawings, and abstract is incorporated herein by reference in its entirety.

BACKGROUND

The present invention relates to a radio receiver and to an intermediate frequency selection method. For example, the present invention relates to a radio receiver having a quadrature demodulator for generating an intermediate frequency signal, and to an intermediate frequency selection method used in such a radio receiver.

A receiver for receiving signals based on two communication methods, namely, the Bluetooth (registered trademark) communication method and the ZigBee (registered trademark) communication method, is disclosed in A 0.6-V Zero-IF/Low-IF Receiver With Integrated Fractional-N Synthesizer For 2.4-GHz ISM-Band Applications, IEEE JOURNAL OF SOLID-STATE CIRCUITS, VOL. 45, NO. 3, Mar. 2010. This receiver includes a quadrature demodulator so that the quadrature demodulator converts a communication signal to an intermediate frequency (IF) signal. This receiver operates in a Low-IF (low intermediate frequency) mode when the Bluetooth communication method is used, and operates in a Zero-IF (zero intermediate frequency) mode when the ZigBee communication method is used. More specifically, the communication signal is converted to an intermediate frequency signal having an intermediate frequency of 2 MHz when a Bluetooth communication system is used, and is converted to an intermediate frequency signal having an intermediate frequency of 0 Hz when a ZigBee communication system is used. A 0.6-V Zero-IF/Low-IF Receiver With Integrated Fractional-N Synthesizer for 2.4-GHz ISM-Band Applications, IEEE JOURNAL OF SOLID-STATE CIRCUITS, VOL. 45, NO. 3, Mar. 2010 also states that an analog filter disposed at the input stage of the quadrature demodulator is operated as a band-pass filter when the Bluetooth communication method is used, and that the analog filter is operated as a low-pass filter when the ZigBee communication method is used.

A receiver for receiving communication signals based on two communication methods is also disclosed in Japanese Unexamined Patent Application Publication (Translation of PCT Application) No. 2004-515104. This receiver receives communication signals based on two communication methods, namely, the UMTS (Universal Mobile Telecommunications System) communication method and the GSM (Global System for Mobile communication) (registered trademark) communication method. This receiver operates in the Zero-IF mode when the UMTS communication method is used, and operates in the Low-IF mode when the GSM communication method is used.

SUMMARY

Japanese Unexamined Patent Application Publication (Translation of PCT Application) No. 2004-515104 and A 0.6-V Zero-IF/Low-IF Receiver With Integrated Fractional-N Synthesizer For 2.4-GHz ISM-Band Applications, IEEE JOURNAL OF SOLID-STATE CIRCUITS, VOL. 45, NO. 3, Mar. 2010 provide a receiver that receives communication signals based on two communication methods and reuse functional blocks to the maximum. However, the receiver users a fixed intermediate frequency mode when the communication method is determined. This causes a problem where reception performance is not always maximized in accordance with radio communication conditions when communication is to be established by using a particular communication method.

Other problems and novel features will become apparent from the following description and from the accompanying drawings.

A radio receiver according to an aspect of the present invention includes a quadrature demodulator that generates an intermediate frequency signal, and is capable of selectively operating the quadrature demodulator either in a zero intermediate frequency mode or in a low intermediate frequency mode in accordance with radio wave reception conditions.

The above aspect of the present invention makes it possible to receive a radio frequency signal in an intermediate frequency mode suitable for the radio wave reception conditions.

BRIEF DESCRIPTION OF THE DRAWINGS

Embodiments of the present invention will be described in detail based on the following figures, in which:

FIG. 8 is a block diagram illustrating an exemplary configuration of a zero intermediate frequency signal processing section;

FIGS. 9A and 9B are schematic diagrams illustrating exemplary signals in the zero intermediate frequency signal processing section;

FIG. 10 is a block diagram illustrating an exemplary configuration of a low intermediate frequency signal processing section;

DETAILED DESCRIPTION

Figure 1:
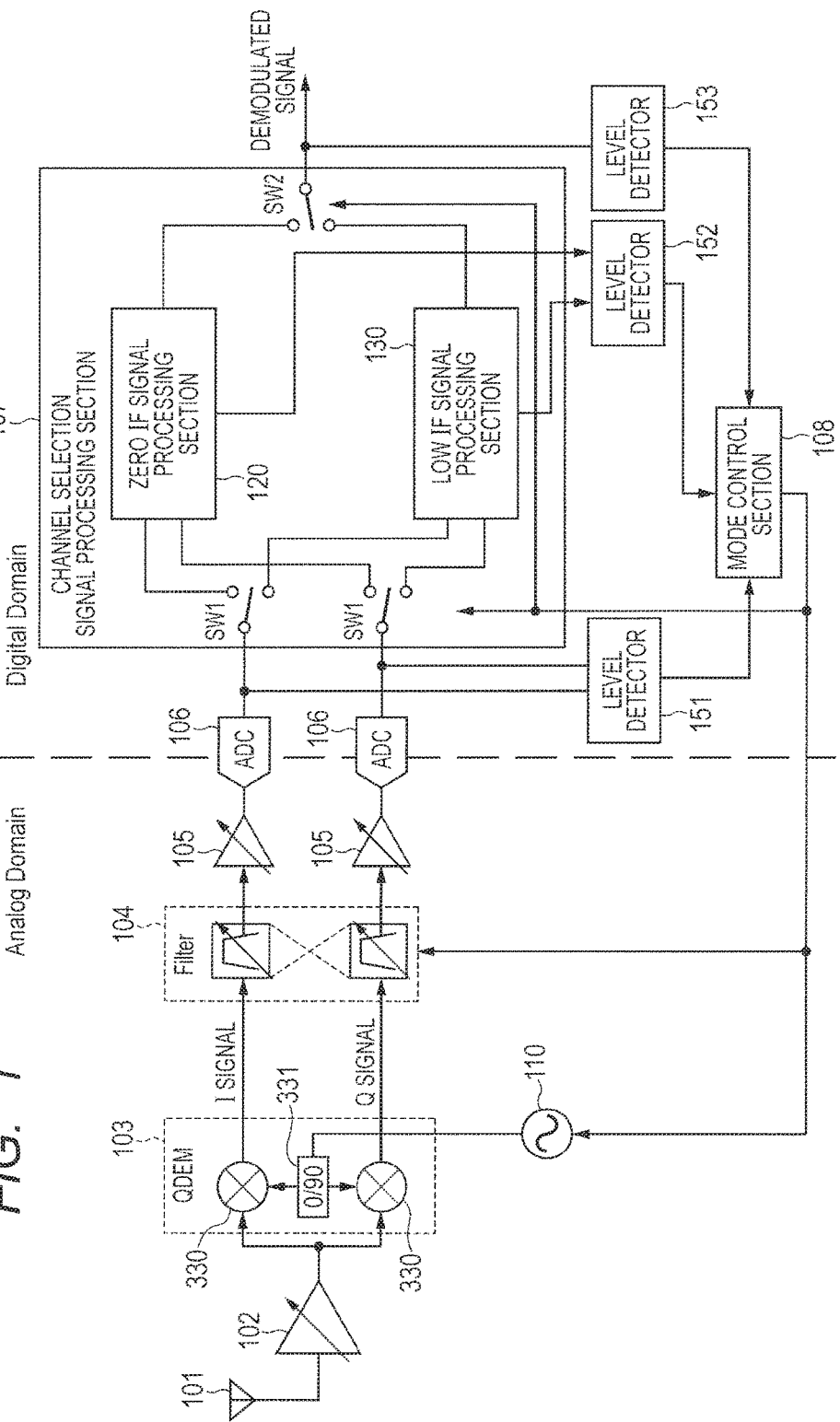
FIG. 1 is a block diagram illustrating a radio receiver according to a first embodiment of the present invention.

Before the explanation of later-described embodiments of the present invention, circumstances under which the embodiments are contemplated will be described. A system design factor to be considered when designing a receiver for a radio communication device is a bandwidth and resolution of an ADC (Analog-to-Digital Converter). The bandwidth and resolution of the ADC are generally determined based on the bandwidth and signal power level for handling an analog demodulation signal on the analog output side.

When the power consumption of a receiver is to be reduced in a narrowband signal band system for the much talked-about IoT (Internet of Things), the bandwidth and/or resolution of the ADC cannot be considerably increased. In the receiver whose power consumption is to be reduced, a signal band and applicable power level are restricted in an analog portion. Thus, it is essential that the signal band and intermediate frequency (IF) in an analog region be properly handled. The reduction of power consumption is important particularly in a narrowband communication system for the IoT. Therefore, the characteristics of the ADC are such that the signal band cannot be raised. This makes it necessary to lower the intermediate frequency.

Two intermediate frequency modes, namely, a zero IF mode and a low IF mode, are applicable to the narrowband communication system. In the zero IF mode, the intermediate frequency is 0 Hz ($f_{IF}$=0 Hz). In the zero IF mode, problems are generally caused, for example, by 1/f noise, DC (Direct Current) offset, and even-order distortion. Meanwhile, in the low IF mode, the intermediate frequency is a frequency greater than a signal bandwidth, such as a frequency several times as great as the signal bandwidth. If, for example, the signal bandwidth is 300 kHz, the intermediate frequency $f_{IF}$ is determined to be within a range that satisfies the following relational expression:

$$300\text{ kHz} \leq f_{IF} < N \times 300\text{ kHz} < \text{Nyquist bandwidth of ADC}$$

More specifically, the Nyquist frequency of the ADC is approximately 5 MHz to 6 MHz, and the intermediate frequency $f_{IF}$ is approximately 500 kHz or 600 kHz, which is obtained when N is equal to approximately 2.

As described above, the problems arising in the zero IF mode are 1/f noise, DC offset, and even-order distortion. Meanwhile, in the low IF mode, which requires that an image frequency and intermediate frequency be high, it is necessary to use a wider ADC band than in the zero IF mode. Advantages and disadvantages of the IF modes are summarized in the following characteristics table:

TABLE 1

| Mode | 1/f noise | DC offset | Even-order distortion (second-order) | Image interference | Required ADC band |
|---|---|---|---|---|---|
| Low IF | Small influence | Small influence | Small influence | Great influence | High |
| Zero IF | Great influence | Great influence | Great influence | Small influence | Low |

The above table indicates that the individual characteristics of the zero IF and low IF modes are in a contradictory relationship.

According to Japanese Unexamined Patent Application Publication (Translation of PCT Application) No. 2004-515104 and A 0.6-V Zero-IF/Low-IF Receiver With Integrated Fractional-N Synthesizer For 2.4-GHz ISM-Band Applications, IEEE JOURNAL OF SOLID-STATE CIRCUITS, VOL. 45, NO. 3, Mar. 2010, either one of the two intermediate frequency modes is selected for one communication method to establish communication only in the selected intermediate frequency mode. If, for example, the low IF mode is selected, the established communication is susceptible to interference in an image frequency band. If, by contrast, the zero IF mode is selected, problems are caused by 1/f noise and DC offset so that minimum receiver sensitivity characteristics requiring a high receive gain do not improve.

The inventors of the present invention have found that the advantages and disadvantages of the intermediate frequency modes can be offset each other to cover their disadvantages in accordance with a radio wave reception environment by detecting the radio wave reception environment and selecting an intermediate frequency mode suitable for the detected radio wave reception environment. A receiver capable of establishing robust communication can be implemented without degrading the reception performance of the receiver by selecting an appropriate intermediate frequency mode for the radio wave reception environment, which may change with time.

Embodiments to which means for solving the above problems are applied will now be described in detail with reference to the accompanying drawings. In the following description and in the drawings, omissions and simplifications are made as needed for the clarification of explanation. Further, hardware for various elements depicted in the drawings as functional blocks for performing various processes can be implemented by a CPU (Central Processing Unit), a memory, or other circuit while software for such elements can be implemented, for instance, by a program loaded into the memory. Therefore, it is to be understood by those skilled in the art that the functional blocks are not limited to hardware or software, but can be variously implemented by hardware only, by software only, or by a combination of hardware and software. Furthermore, like elements in the drawings are designated by the same reference numerals and will not be redundantly described.

Moreover, the above-mentioned program can be stored on various types of non-transitory computer readable media and supplied to a computer. The non-transitory computer readable media include various types of tangible storage media. Examples of the non-transitory computer readable media include a magnetic recording medium (e.g., flexible disk, magnetic tape, or hard disk), a magnetooptical recording medium (e.g., magnetooptical disk), a CD-ROM (Read Only Memory), a CD-R, a CD-R/W, and a semiconductor memory (e.g., mask ROM, PROM (Programmable ROM), EPROM (Erasable PROM), flash ROM, or RAM (Random Access Memory)). The program may be supplied to the computer by using various types of transitory computer readable media. Examples of the transitory computer readable media include an electrical signal, an optical signal, and an electromagnetic wave. The transitory computer readable media can supply the program to the computer through an electric wire, optical fiber, or other wired communication path or through a radio communication path.

In the following description of embodiments, if necessary for convenience sake, a description of the present invention will be divided into a plurality of sections or embodiments, but unless specifically stated, they are not unrelated to each other, but are in such a relation that one is, for example, an exemplary modification, an exemplary application, a detailed explanation, or a supplementary explanation of a part or the whole of the other. Also, in the embodiments described below, when the number of elements (including the number of pieces, numeric values, amounts, ranges, etc.) is mentioned, the number of elements is not limited to a specific number unless, for example, specifically stated or apparently limited to a specific number in principle. The number larger or smaller than the specific number is also applicable.

Further, in the embodiments described below, it is obvious that their elements (including, for example, operating steps) are not always indispensable unless, for example, specifically stated or apparently indispensable in principle. Similarly, in the embodiments described below, when, for example, the shape of the elements and the positional relationship therebetween are mentioned, for example, the substantially approximate or similar shapes are included therein unless, for example, they are specifically stated or can be apparently excluded in principle. The same goes for the aforementioned number of elements (including the number of pieces, numeric values, amounts, ranges, etc.).

First Embodiment

FIG. 1 illustrates a radio receiver according to a first embodiment of the present invention. The radio receiver 100 includes an antenna 101, an LNA (Low Noise Amplifier) 102, a quadrature demodulator (QDEM) 103, an analog filter 104, variable gain amplifiers (VGAs) 105, ADCs (Analog-to-Digital Converters) 106, a channel selection signal processing section 107, an oscillator 110, a mode control section 108, a level detector 151, a level detector 152, and a level detector 153.

The antenna 101 receives a radio frequency signal (radio communication signal). The LNA 102 amplifies the radio communication signal. It is assumed that the signal bandwidth of the radio communication signal is, for example, from several kHz to approximately 1 MHz. For example, IEEE Std 802.15.1, which is represented by Bluetooth, or IEEE Std 802.15.4, which is represented by ZigBee, is used as the communication standard for the radio communication signal. These standards are also applied, for instance, to the IoT and M2M (Machine-to-Machine). Alternatively, the IEEE Std 802.15.4g and IEEE Std 802.11ah communication standards for a sub-GHz band may be used.

The oscillator 110 outputs a local oscillation signal. The oscillator 110 is configured so that its oscillation frequency is variable. For example, the oscillator 110 is configured as a VCO (voltage-controlled oscillator). The oscillator 110 is included, for example, in a PLL (Phase Locked Loop) circuit (not shown), and outputs a local oscillation signal that is synchronized with a predetermined reference clock signal.

The quadrature demodulator 103 includes two frequency mixers 330 and a phase shifter 331. The phase shifter 331 inputs the local oscillation signal, and outputs the local oscillation signal having two quadrature phases to each frequency mixer 330. Each frequency mixer 330 multiplies the radio communication signal by the local oscillation signal (mixes these signals) in order to convert the radio communication signal to an intermediate frequency signal having an intermediate frequency lower than the frequency of the radio communication signal. The intermediate frequency signal derived from conversion in one frequency mixer 330 (generated by one frequency mixer 330) corresponds to an I (in-phase) signal, and the intermediate frequency signal generated by the other frequency mixer 330 corresponds to a Q (quadrature-phase) signal.

The radio receiver 100 (quadrature demodulator 103) has two operating modes, namely, a zero intermediate frequency mode and a low intermediate frequency mode. When the radio receiver 100 operates in the zero intermediate frequency mode, control is exercised so that the frequency $f_{LO}$ of the local oscillation signal outputted from the oscillator 110 is equal to the frequency $f_{RF}$ of the radio communication signal. In this instance, the frequency $f_{IF}$ of the intermediate frequency signal is zero. Meanwhile, when the radio receiver 100 operates in the low intermediate frequency mode, control is exercised so that the equation $f_{IF}=|f_{RF}-f_{LO}|$ is satisfied by the relationship between the frequency $f_{LO}$ of the local oscillation signal and the frequency $f_{IF}$ of a predetermined intermediate frequency signal. The following description is given on the assumption that the equation $f_{IF}=f_{RF}-f_{LO}$ is satisfied by the frequency $f_{IF}$ of the intermediate frequency signal.

The analog filter 104 bandlimits an I signal and Q signal that are generated by the quadrature demodulator 103. The analog filter 104 is configured so that switching can be made between a low-pass filter and a band-pass filter. The analog filter 104 may be configured as an active filter or as a passive filter. When the radio receiver 100 operates in the zero intermediate frequency mode, the analog filter 104 functions as a low-pass filter, and passes the frequency components of the I and Q signals that are not higher than a predetermined frequency. When the radio receiver 100 operates in the low intermediate frequency mode, the analog filter 104 functions as a band-pass filter, and passes the signal components of the I and Q signals that have a desired frequency band including the frequency $f_{IF}$ of the intermediate frequency signal.

The variable gain amplifiers 105 amplify the I and Q signals that have passed through the analog filter 104. The variable gain amplifiers 105 adjust the signal levels of the I and Q signals to a signal level handled by the ADCs 106. The ADCs 106 receive the I and Q signals, which are inputted through the analog filter 104 and the variable gain amplifiers 105, and convert the I and Q signals to digital signals, respectively. In the radio receiver 100, an analog domain is formed by the elements ranging from the antenna 101 to the variable gain amplifiers 105. Meanwhile, a digital domain is formed by the channel selection signal processing section 107, the mode control section 108, and the level detectors 151-153, which are disposed at the output stage of the ADCs 106.

The channel selection signal processing section (received signal processing section) 107 generates a demodulated signal from the I and Q signals (intermediate frequency signals) that are converted to digital signals. The channel selection signal processing section 107 includes a zero intermediate frequency signal processing section 120, a low intermediate frequency signal processing section 130, two switches SW1, and a switch SW2. The switches SW1 switch the output destinations of the I and Q signals, which are converted to digital signals by the ADCs 106, between the zero intermediate frequency signal processing section 120 and the low intermediate frequency signal processing section 130. The switch SW2 selects either the zero intermediate frequency signal processing section 120 or the low intermediate frequency signal processing section 130. When the radio receiver 100 operates in the zero intermediate frequency mode, the switches SW1 output the I and Q signals to the zero intermediate frequency signal processing section 120, and the switch SW2 selects the zero intermediate frequency signal processing section 120. Meanwhile, when the radio receiver 100 operates in the low intermediate frequency mode, the switches SW1 output the I and Q signals to the low intermediate frequency signal processing section 130, and the switch SW2 selects the low intermediate frequency signal processing section 130.

The zero intermediate frequency signal processing section 120 generates a demodulated signal (received baseband signal) from the I and Q signals, which are inputted from the switches SW1, and outputs the generated demodulated signal through the switch SW2. Further, the zero intermediate frequency signal processing section 120 generates an I/Q signal having a frequency band different from a selected wave frequency band including the demodulated signal, and outputs the generated signal to the level detector 152. The zero intermediate frequency signal processing section 120 outputs to the level detector 152, for example, an I/Q signal in a predetermined frequency band that includes at least either an upper adjacent frequency band or a lower adjacent frequency band. The upper adjacent frequency band is a frequency band that is higher than and adjacent to the selected wave frequency band. The lower adjacent frequency band is a frequency band that is lower than and adjacent to the selected wave frequency band.

The low intermediate frequency signal processing section 130 generates a demodulated signal from the I and Q signals, which are inputted from the switches SW1, and outputs the generated demodulated signal through the switch SW2. Further, the low intermediate frequency signal processing section 130 generates an I/Q signal having a frequency band different from the selected wave frequency band including the demodulated signal, and outputs the generated signal to the level detector 152. The low intermediate frequency signal processing section 130 outputs to the level detector 152, for example, an I/Q signal in a predetermined frequency band that includes at least either the upper adjacent frequency band or the lower adjacent frequency band.

The level detectors 151-153 each detect the intensity of a signal (a signal level). The level detector 151 (level detector 1) detects the signal levels of the I and Q signals outputted from the ADCs 106. The level detector 152 (level detector 2) detects the signal level of an I/Q signal in a frequency band different from the selected wave frequency band that is outputted from the zero intermediate frequency signal processing section 120 and the low intermediate frequency signal processing section 130. The level detector 152 detects, for example, an I/Q signal in a predetermined frequency band that includes at least either the upper adjacent frequency band or the lower adjacent frequency band. The level detector 153 (level detector 3) detects the signal level of the demodulated signal outputted through the switch SW2.

The level detectors 151-153 generate, for example, an RSSI (Received Signal Strength Indication). The level detectors 151-153 arithmetically process the signal amplitudes of the I and Q signals. The level detectors 151-153, for example, calculate the square root of the sum of squares of amplitude values of the I and Q signals, and generate the signal level of an RMS (Root Mean Square).

Alternatively, the level detectors 151-153 may accumulate a fixed number of amplitude values of the I and Q signals, and perform an FFT (Fast Fourier Transform) on the accumulated data to calculate a signal amplitude level.

The mode control section 108 switches the operating mode of the radio receiver 100 between the zero intermediate frequency mode and the low intermediate frequency mode. Based, for example, on the signal levels detected respectively by the level detector 151, the level detector 152, and the level detector 153, the mode control section 108 chooses between the zero intermediate frequency mode and the low intermediate frequency mode. In the present embodiment, the mode control section 108 switches between the zero intermediate frequency mode and the low intermediate frequency mode particularly while radio communication signals based on the same communication method. That is to say, the mode control section 108 switches between the zero intermediate frequency mode and the low intermediate frequency mode without changing the communication method for the radio communication signals.

When the zero intermediate frequency mode is selected, the mode control section 108 exercises control so that the oscillation frequency $f_{LO}$ of the oscillator 110 is equal to the selected wave frequency. Further, the mode control section 108 transmits a control signal to the analog filter 104 in order to operate the analog filter 104 as a low-pass filter. Furthermore, the mode control section 108 transmits a control signal to the channel selection signal processing section 107 for the purpose of controlling the switches SW1 so that the I and Q signals are inputted to the zero intermediate frequency signal processing section 120, and causing the switch SW2 to select the zero intermediate frequency signal processing section 120.

When the low intermediate frequency mode is selected, the mode control section 108 exercises control so that the oscillation frequency $f_{LO}$ of the oscillator 110 is lower than the selected wave frequency by the intermediate frequency $f_{IF}$. Further, the mode control section 108 transmits a control signal to the analog filter 104 in order to operate the analog filter 104 as a band-pass filter. Furthermore, the mode control section 108 transmits a control signal to the channel selection signal processing section 107 for the purpose of controlling the switches SW1 so that the I and Q signals are inputted to the low intermediate frequency signal processing section 130, and causing the switch SW2 to select the low intermediate frequency signal processing section 130.

[Radio Communication Signals]

Figure 2:
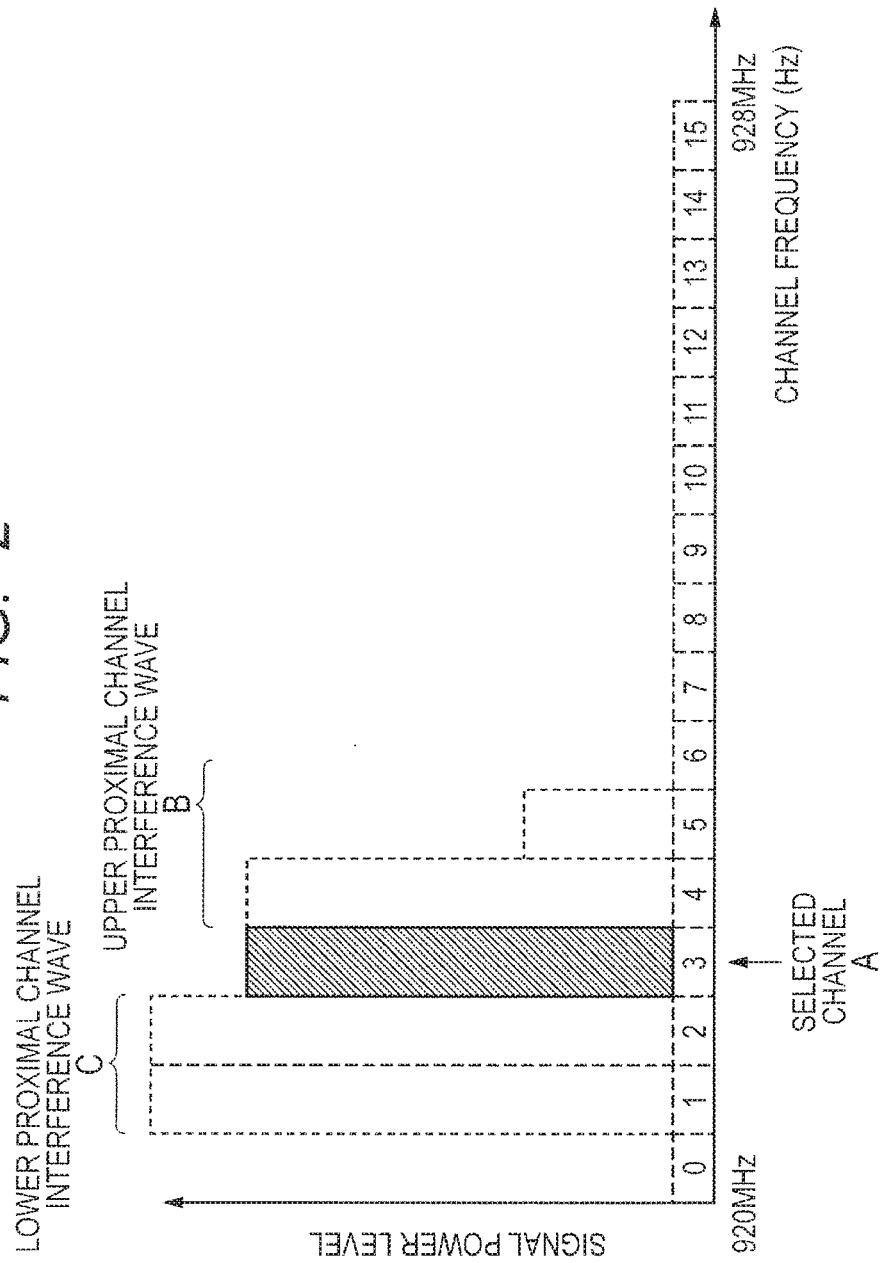
FIG. 2 is a schematic diagram illustrating an exemplary arrangement of radio communication signals.

FIG. 2 illustrates an exemplary arrangement of radio communication signals. Here, a 920 MHz to 928 MHz communication system for Japan's specified low power radio is taken as an example of an IEEE 802.15.4g communication system for the IoT. This communication system has 16 channels (No. 0 to No. 15), and the bandwidth of each channel is 400 kHz. FIG. 2 shows the signal level of a signal present on each channel at a certain point of time.

Let us now assume that channel No. 3 is a selected (desired) communication channel. A received signal component bandlimited by the analog filter 104 is inputted to the ADCs 106. When channel No. 3 is selected, bandlimiting is performed by the analog filter 104 so that the I and Q signals to be subjected to analog-to-digital conversion by the ADCs 106 contain signal components in the frequency band of channel No. 3 and in frequency bands in the vicinity of the frequency band of channel No. 3. If, for instance, the I and Q signals to be subjected to analog-to-digital conversion contain signal components present on adjacent channels and on channels next to the adjacent channels, the I and Q signals contain signal components present on channels No. 1 to No. 5.

In FIG. 2, region A represents the frequency region of channel No. 3, which is the selected channel; region B represents the frequency region of channels No. 4 and No. 5, which are upper adjacent channels; and region C represents the frequency region of channels No. 1 and No. 2, which are lower adjacent channels. The ADCs 106 output the I and Q signals containing the frequency components in regions A, B, and C to the channel selection signal processing section 107 and the level detector 151. The level detector 151 detects the signal levels of signals that are included in the whole band of the I and Q signals outputted from the ADCs 106, that is, present on channels No. 1 to No. 5.

The channel selection signal processing section 107 generates a demodulated signal by performing a process of extracting the frequency component in region A, which corresponds to the selected channel, from the I and Q signals containing the frequency components in regions A, B, and C. The level detector 153 detects the signal level of the demodulated signal generated by the channel selection signal processing section 107, that is, a signal present on channel No. 3 represented by region A in FIG. 2.

Here, the signals present on the upper adjacent channels (upper adjacent frequency bands) and the lower adjacent channels (lower adjacent frequency bands) may act as an interference wave for the signal present on the selected channel. The zero intermediate frequency signal processing section 120 and the low intermediate frequency signal processing section 130 also perform a process of extracting signals present, for example, on the upper adjacent channels, that is, channels No. 4 and No. 5, or on the lower adjacent channels, that is, channels No. 1 and No. 3, and output the extracted signals to the level detector 152. The level detector 152 detects the signal levels of the signals present on the upper adjacent channels or the lower adjacent channels.

The mode control section 108 determines radio wave reception conditions in accordance with the signal levels detected by the level detectors 151-153, and select an operating mode (reception mode). In accordance with the signal level of a signal present in region A, which corresponds to the selected channel, and with the signal level of a signal present in region B and/or region C, which are different from region A, the mode control section 108 selects either the zero intermediate frequency mode or the low intermediate frequency mode. More specifically, the mode control section 108 determines the level of a signal in region B and/or the level of a signal in region C, which are interference wave signals for the level of a signal in region A, which corresponds to the selected channel, and selects an intermediate frequency mode that provides reception performance suitable for the radio wave reception conditions.

The levels of signals in regions A, B, and C can be estimated, for example, from the signal levels detected by the level detectors 151-153, a total receive gain, and filter characteristics.

For example, the mode control section 108 compares the signal level of the selected channel with a predetermined threshold value (threshold value 1). If the signal level of the selected channel is not lower than threshold value 1, the mode control section 108 selects the zero intermediate frequency mode. Alternatively, if the signal level of the selected channel is not lower than threshold value 1, the mode control section 108 may further calculate the ratio between the signal level of the selected channel and the signal level of the upper adjacent frequency bands, and compare the calculated ratio with a predetermined threshold value (threshold value 2). If the calculated ratio is greater than threshold value 2, the mode control section 108 may select the zero intermediate frequency mode. If the calculated ratio is not greater than threshold value 2, the mode control section 108 may select the low intermediate frequency mode.

If the signal level of the selected channel is lower than threshold value 1, the mode control section 108 may further calculate the ratio between the signal level of the selected channel and the signal level of the lower adjacent frequency bands, and compare the calculated ratio with a predetermined threshold value (threshold value 3). If the calculated ratio is greater than threshold value 3, the mode control section 108 may select the low intermediate frequency mode. If the calculated ratio is not greater than threshold value 3, the mode control section 108 may select the zero intermediate frequency mode.

When the signal level of the upper adjacent frequency bands is detected by the level detector 152, the signal level of the lower adjacent frequency bands can be calculated. More specifically, the signal level of region C, which corresponds to the lower adjacent frequency bands, can be determined by eliminating the result of detection by the level detector 153, which detects the signal level of region A, and the result of detection by the level detector 152, which detects the signal level of region B, from the result of detection by the level detector 151, which detects the signal levels of all frequency bands in regions A to C shown in FIG. 2. Similarly, even when the signal level of the lower adjacent frequency bands is detected by the level detector 152, the signal level of the upper adjacent frequency bands can be calculated. Even if the signal levels of frequency bands in regions A and B or in regions A and C, the signal levels of the upper adjacent frequency bands and lower adjacent frequency bands, can be calculated.

[Analog Filter]

Figure 3:
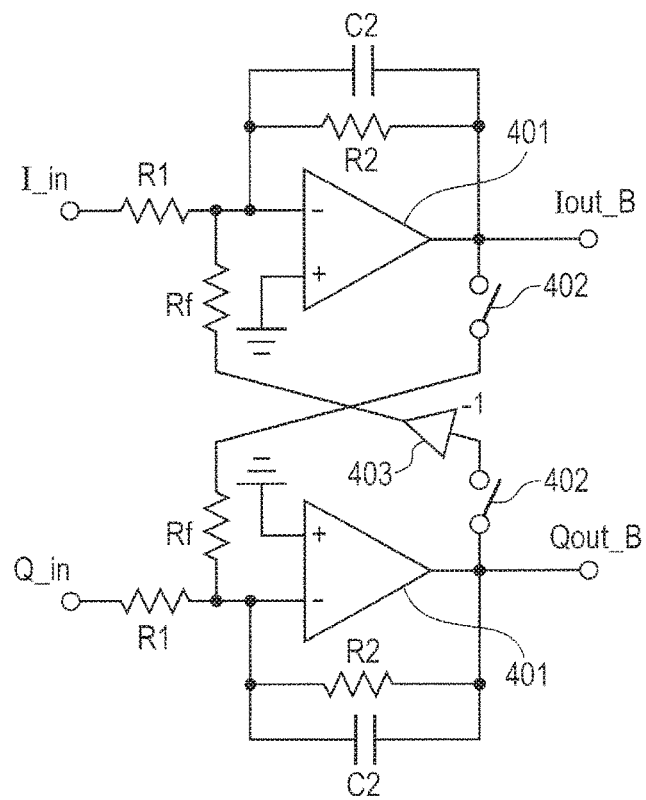
FIG. 3 is a block diagram illustrating an exemplary configuration of an analog filter.

FIG. 3 illustrates an exemplary configuration of the analog filter 104. The analog filter 104 is configured as an active filter, and includes resistors R1, R2, Rf, a capacitor C2, an operational amplifier 401, a switch 402, and an inverter 403. In reality, the I and Q signals, which are intermediate frequency signals, are configured as actuation signals in the analog domain. However, FIG. 3 shows the actuation signals as one signal.

The analog filter 104 has a first-order RC active filter circuit for an I signal section and a first-order RC active filter circuit for a Q signal section. In the analog filter 104, the resistors R1, R2, the capacitor C1, and the operational amplifier 401 form a first-order RC active filter. An output signal Iout_B of the I signal section is coupled to a minus input terminal of the operational amplifier for the Q signal section through the switch 402 and the resistor Rf. An output signal Qout_B of the Q signal section is coupled to a minus input terminal of the operational amplifier 401 for the I signal section through the switch 402, the inverter 403 and the resistor Rf. When the switch 402 is off (open), the first-order RC active filter for the I signal section and the first-order RC active filter for the Q signal section operate independently of each other. In this instance, the analog filter 104 functions as a first-order low-pass filter.

When the switch 402 is on (closed), the output signal of the I signal section is fed back to the input of the Q signal section through the resistor Rf. Further, the output signal of the Q signal section is phase-inverted by the inverter 403, and then fed back to the input of the I signal section through the resistor Rf. In this instance, a signal feedback is added to the I signal section and to the Q signal section. The result is equivalent to the shift of the pole of a transfer function of a low-pass filter toward an imaginary number by $\omega_{IF}$ ($\omega_{IF}=1/(C2 \times Rf)$). Consequently, the analog filter 104 functions as a complex band-pass filter.

Figure 4A:
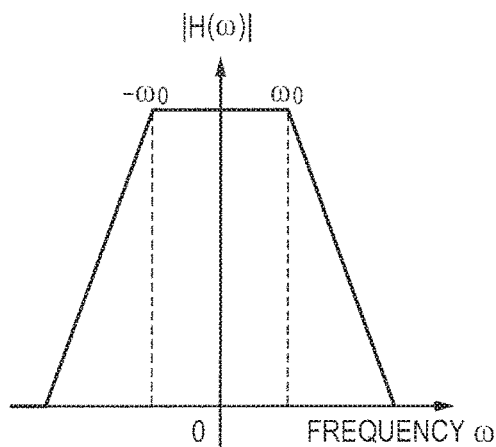
FIGS. 4A and 4B are graphs illustrating a transfer function of the analog filter.
Figure 4B:
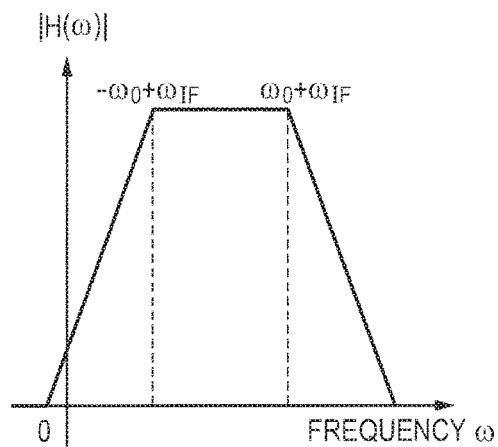

FIGS. 4A and 4B illustrate the transfer function of the analog filter 104. FIG. 4A illustrates the transfer function that is present when the analog filter 104 functions as a low-pass filter. FIG. 4B illustrates the transfer function that is present when the analog filter 104 functions as a complex band-pass filter. In FIGS. 4A and 4B, the horizontal axis represents frequency $\omega$, and the vertical axis represents the magnitude $|H(\omega)|$ of the transfer function.

When functioning as a low-pass filter, the analog filter 104 passes a signal component within a frequency range of $-\omega_0$ to $+\omega_0$ and attenuates signal components having the other frequencies, as indicated in FIG. 4A. Meanwhile, when functioning as a band-pass filter, the analog filter 104 passes signal components within a frequency range of $-\omega_0+\omega_{IF}$ to $+\omega_0+\omega_{IF}$ and attenuates signal components having the other frequencies, as indicated in FIG. 4B.

By controlling the switch 402 in the analog filter 104, the mode control section 108 (see FIG. 1) allows the analog filter 104 to function as a low-pass filter or function as a band-pass filter. In the zero intermediate frequency mode, the mode control section 108 turns off the switch 402, thereby allowing the analog filter 104 to function as a low-pass filter. In the low intermediate frequency mode, the mode control section 108 turns on the switch 402, thereby allowing the analog filter 104 to function as a complex band-pass filter. When the analog filter 104 functions as a low-pass filter in the zero intermediate frequency mode, the band of a signal inputted to the ADCs 106 is narrower than in the low intermediate frequency mode in which the analog filter 104 functions as a complex band-pass filter.

Figure 5:
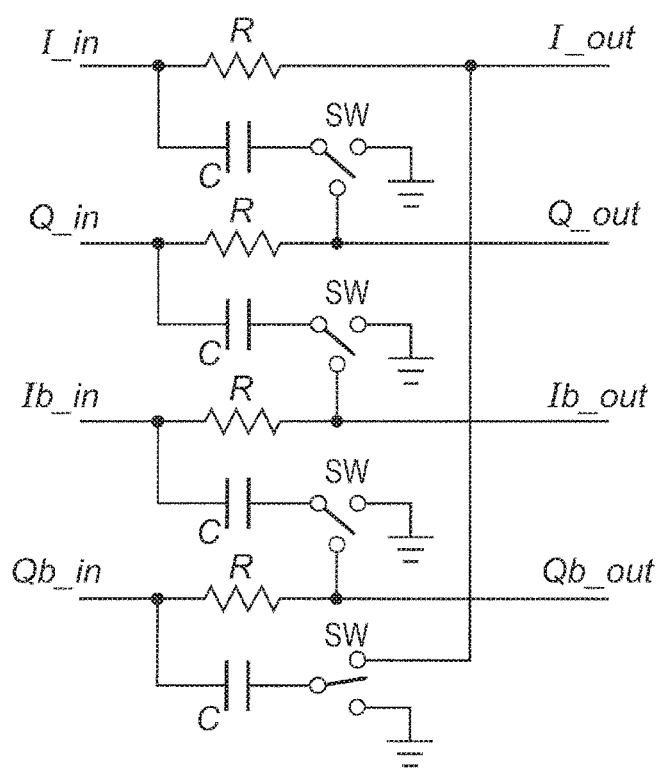
FIG. 5 is a circuit diagram illustrating another exemplary configuration of the analog filter.

FIG. 5 illustrates another exemplary configuration of the analog filter. The analog filter illustrated in FIG. 5 is configured as a passive filter, and includes a resistor R, a capacitor C, and a switch SW. When a terminal disposed opposite the signal input terminal of the capacitor C is grounded through the switch SW, the resistor R and the capacitor C operates as a low-pass filter having a cut-off frequency of $\omega_c=1/RC$.

When the switch SW in the analog filter 104 turns on, an output terminal Q_out is coupled to one end of the capacitor that is coupled at the other end to an input terminal I_in, an output terminal Ib_out is coupled to one end of the capacitor that is coupled at the other end to an input terminal Q_in, an output terminal Qb_out is coupled to one end of the capacitor that is coupled at the other end to an input terminal Ib_in, and an output terminal I_out is coupled to one end of the capacitor that is coupled at the other end to an input terminal Qb_in. In this instance, the analog filter 104 functions as a poly-phase (all-pass) filter expressed by the equation $\omega=1/RC$.

Figure 6:
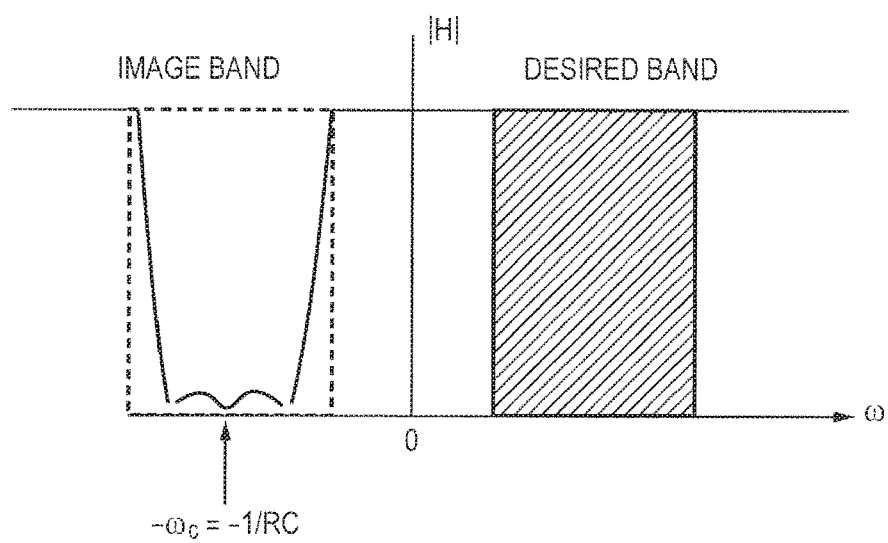
FIG. 6 is a schematic diagram illustrating the frequency response of the transfer function of the analog filter.

FIG. 6 illustrates the frequency response of the transfer function of the analog filter 104 in consideration of the I and Q signals that are present when the analog filter 104 functions as a poly-phase filter. In FIG. 6, the horizontal axis represents frequency $\omega$, and the vertical axis represents the magnitude $|H|$ of the transfer function. As indicated in FIG. 6, a phase shift occurs only in an image band in the vicinity of $-\omega_c=-1/RC$ so that the image band is suppressed after signal synthesis of the I and Q signals.

By controlling the switch SW in the analog filter 104, the mode control section 108 (see FIG. 1) allows the analog filter 104 to function as a low-pass filter or function as a poly-phase filter. In the zero intermediate frequency mode, the mode control section 108 allows the switch SW to select a ground, thereby allowing the analog filter 104 to function as a low-pass filter. In the low intermediate frequency mode, the mode control section 108 allows the switch SW to select a side opposite the ground, thereby allowing the analog filter 104 to function as a poly-phase filter.

In the low intermediate frequency mode, the image band needs to be suppressed because the image band is superimposed over a desired signal at the time of I/Q signal synthesis. The image band may be suppressed by using the aforementioned active complex band-pass filter or passive poly-phase filter.

[Examples of Analog Filter Signals]

Figure 7A:
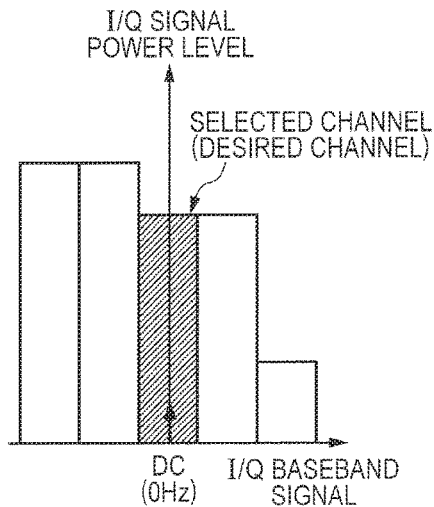
FIGS. 7A to 7D are schematic diagrams illustrating exemplary input/output signals of the analog filter.
Figure 7B:
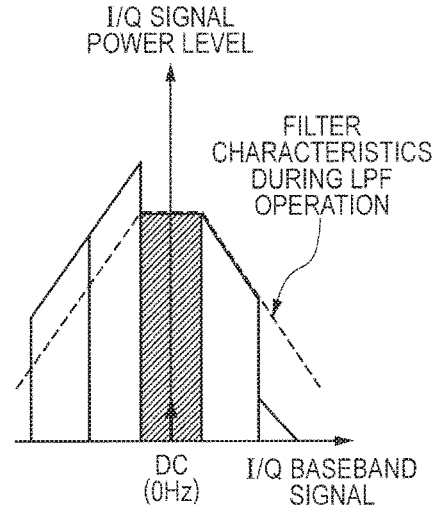
Figure 7C:
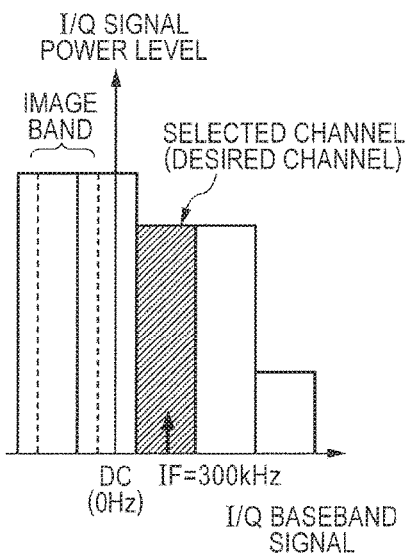
Figure 7D:
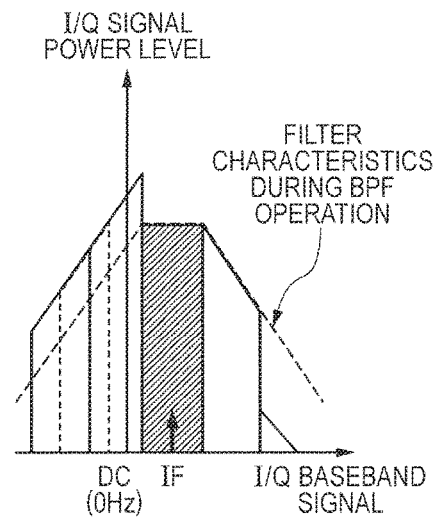

FIGS. 7A to 7D illustrate exemplary input/output signals of the analog filter 104. FIGS. 7A and 7B illustrate exemplary input/output signals of the analog filter 104 in the zero intermediate frequency mode. FIGS. 7C and 7D illustrate exemplary input/output signals of the analog filter 104 in the low intermediate frequency mode. In FIGS. 7A to 7D, the horizontal axis represents an I/Q baseband signal (frequency), and the vertical axis represents the power level of the I/Q signal.

In the zero intermediate frequency mode, an intermediate frequency signal on the selected channel that has a center frequency of 0 Hz is inputted to the analog filter 104 from the quadrature demodulator 103 (see FIG. 1). It is assumed as indicated in FIG. 7A that a signal is present on the lower and upper adjacent channels for the selected channel. These signals may act as an interference wave for a signal on the selected channel. In the zero intermediate frequency mode, the analog filter 104 functions as a low-pass filter. When, for instance, the signal band of a radio communication signal is 400 kHz per channel, the analog filter functioning as a low-pass filter has pass characteristics for passing 200 kHz and lower frequency components.

If, for example, the frequency response of the low-pass filter is as indicated in FIG. 4A, the output signal of the analog filter 104 that is present on the lower and upper adjacent channels is attenuated as illustrated in FIG. 7B. In the zero intermediate frequency mode, the signal shown in FIG. 7B is converted to a digital signal by the ADCs 106 and inputted to the zero intermediate frequency signal processing section 120.

Meanwhile, in the low intermediate frequency mode, an intermediate frequency signal on the selected channel that has a center frequency of the intermediate frequency $f_{IF}$ is inputted to the analog filter 104 from the quadrature demodulator 103 (see FIG. 1). It is assumed as indicated in FIG. 7C that a signal is present on the lower and upper adjacent channels for the selected channel. In the low intermediate frequency mode, an image interference wave (image band) appears in a minus frequency region in line symmetry with respect to the signal band of the selected channel centered at DC (0 Hz). In the low intermediate frequency mode, the analog filter 104 functions as a band-pass filter. When, for instance, the intermediate frequency $f_{IF}$ is 300 kHz and the signal bandwidth is 400 kHz per channel, the analog filter 104 functioning as a band-pass filter has pass characteristics for passing 100 kHz to 500 kHz frequency components.

If, for example, the frequency response of the band-pass filter is as indicated in FIG. 4B, the output signal of the analog filter 104 that is present on the lower and upper adjacent channels is attenuated as illustrated in FIG. 7D. The image band overlaps with the frequency band of the lower adjacent channels, and the image interference wave is also attenuated by the analog filter 104. In the low intermediate frequency mode, the signal shown in FIG. 7D is converted to a digital signal by the ADCs 106 and inputted to the low intermediate frequency signal processing section 130.

[Zero Intermediate Frequency Signal Processing Section]

FIG. 8 illustrates an exemplary configuration of the zero intermediate frequency signal processing section 120. The zero intermediate frequency signal processing section 120 includes two LPFs (Low-Pass Filters) 201, two LPFs 202, a complex multiplier 203 and an adder 204. The switches SW1, SW2 (see FIG. 1) are omitted from FIG. 8. In the zero intermediate frequency signal processing section 120, the LPFs 201 (LPFs 1) are used to generate a demodulated signal, and the LPFs 202 (LPFs 2) and the complex multiplier 203 are used to generate a signal in the upper or lower adjacent frequency bands that is to be detected by the level detector 152.

The I and Q signals (see also FIG. 7B) that have a zero intermediate frequency and are converted to digital signals by the ADCs 106 are inputted to the LPFs 201. The LPFs 201 pass I and Q signal frequency components not higher than the frequency of the selected wave frequency band (selected channel) and attenuate the other frequency components. The output signals of the LPFs 201 are added together by the adder 204 and then outputted as a demodulated signal. If it is assumed that the I and Q signals outputted from the LPFs 201 are I and Q, respectively, the demodulated signal is expressed by the equation I+jQ (j is an imaginary number). The level detector 153 detects the signal level of the demodulated signal that is obtained by allowing the adder 204 to add the output signals of the LPFs 201.

The I and Q signals having the zero intermediate frequency, which are converted to digital signals by the ADCs 106, are inputted to the complex multiplier 203. The complex multiplier 203 shifts the frequency spectra of the inputted I and Q signals to a lower or higher frequency side by a predetermined frequency. The complex multiplier 203 shifts the frequency spectra of the intermediate frequency signals in such a manner that, for example, the frequency band to be extracted as an adjacent channel has a center frequency of 0 Hz.

The LPFs 202 pass frequency components of the intermediate frequency signals that are subjected to frequency spectrum shift by the complex multiplier 203 and not higher than a predetermined frequency, and attenuate the other frequency components. The output signals of the LPFs 202 are inputted to the level detector 152 to let the level detector 152 detect their signal levels. In the zero intermediate frequency mode, the mode control section 108 selects an operating mode in accordance with the signal level of the intermediate frequency signal that is detected by the level detector 151, the signal level of the demodulated signal that is detected by the level detector 153, and the signal levels of the output signals of the LPFs 202 that are detected by the level detector 152.

[Exemplary Signals in Zero Intermediate Frequency Signal Processing Section]

FIGS. 9A and 9B illustrate exemplary signals in the zero intermediate frequency signal processing section 120. FIG. 9A illustrates an example of the output signals of the LPFs 201, and FIG. 9B illustrates an example of the output signals of the LPFs 202. In FIGS. 9A and 9B, the horizontal axis represents the I/Q baseband signal (frequency), and the vertical axis represents the power level of the I/Q signal.

If, for example, the signal bandwidth is 400 kHz per channel, the LPFs 201 pass frequency components not higher than 200 kHz, which is half the signal bandwidth per channel. In such an instance, the LPFs 201 pass only an intermediate frequency signal having the zero intermediate frequency in the signal band of the selected channel, as illustrated in FIG. 9A. The demodulated signal can be obtained by adding the I and Q signals that have passed through the LPFs 201.

Meanwhile, the complex multiplier 203 shifts, for example, the frequency spectrum of the intermediate frequency signal to a lower frequency side by 600 kHz. In this instance, as illustrated in FIG. 9B, the position of DC (0 Hz) in the intermediate frequency signal subjected to frequency spectrum shift is the position of a frequency at the boundary between a channel one frequency band higher than the selected channel and a channel two frequency bands higher than the selected channel. The LPFs 202 pass frequency components of the shifted intermediate frequency signal that are, for example, not higher than 400 kHz. In such an instance, as illustrated in FIG. 9B, the LPFs 202 pass only shifted intermediate frequency signals that are on a channel one frequency band higher than the selected channel or on a channel two frequency bands higher than the selected channel. When the signals that have passed through the LPFs 202 are inputted to the level detector 152, the signal levels of the upper adjacent channels can be detected.

[Low Intermediate Frequency Signal Processing Section]

FIG. 10 illustrates an exemplary configuration of the low intermediate frequency signal processing section 130. The low intermediate frequency signal processing section 130 includes two LPFs 301, two LPFs 302, a complex multiplier 303, BPFs (Band-Pass Filters) 304, and an adder 305. The switches SW1, SW2 are omitted from FIG. 10, as is the case with FIG. 8. In the low intermediate frequency signal processing section 130, the LPFs 301, the LPFs 302 (LPFs 3), and the complex multiplier 303 are used to generate a demodulated signal, and the BPFs 304 are used to generate a signal in the upper or lower adjacent frequency bands that is to be detected by the level detector 152.

The I and Q signals (see also FIG. 7D) that have a low intermediate frequency and are converted to digital signals by the ADCs 106 are inputted to the LPFs 301. The LPFs 301 pass I and Q signal frequency components not higher than a predetermined frequency, and attenuate the other frequency components. The LPFs 301 pass frequency components not higher than a frequency that is obtained, for example, by adding a bandwidth approximately half the selected wave frequency band (selected channel) to the intermediate frequency $f_{IF}$, and attenuate the other frequency components. The complex multiplier 303 shifts the frequency spectra of the intermediate frequency signals that have passed the LPFs 301 to a lower frequency side by the intermediate frequency $f_{IF}$. The LPFs 302 pass the frequency components of the intermediate frequency signals that are subjected to frequency spectrum shift by the complex multiplier 303 and not higher than the frequency of the selected wave frequency band, and attenuate the other frequency components. The output signals of the LPFs 302 are added together by the adder 305 and outputted as a demodulated signal. The level detector 153 detects the signal level of the demodulated signal that is obtained by allowing the adder 305 to add the output signals of the LPFs 302.

The I and Q signals that have a low intermediate frequency and are converted to digital signals by the ADCs 106 are inputted to the BPFs 304. The BPFs 304 attenuate frequency components of the intermediate frequency signal that are outside a frequency band different from the selected wave frequency band, and pass frequency components in the frequency band different from the selected wave frequency band. The BPFs 304 pass only frequency components in the frequency band, for example, of the upper or lower adjacent channels. The output signals of the BPFs 304 are inputted to the level detector 152 to let the level detector 152 detect their signal levels. In the low intermediate frequency mode, the mode control section 108 selects an operating mode in accordance with the signal level of the intermediate frequency signal that is detected by the level detector 151, the signal level of the demodulated signal that is detected by the level detector 153, and the signal levels of the output signals of the BPFs 304 that are detected by the level detector 152.

[Exemplary Signals in Low Intermediate Frequency Signal Processing Section]

Figure 11A:
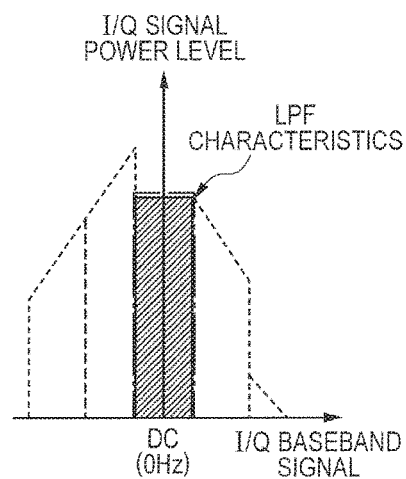
FIGS. 11A and 11B are schematic diagrams illustrating exemplary signals in the low intermediate frequency signal processing section.
Figure 11B:
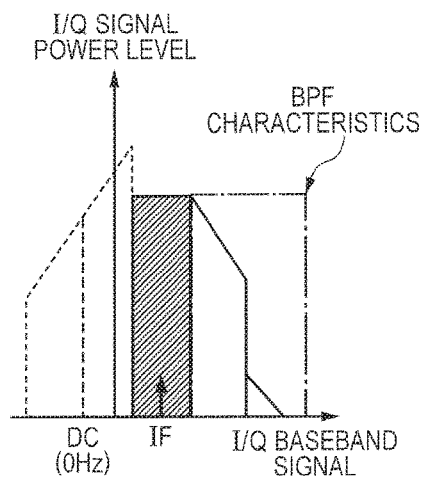

FIGS. 11A and 11B illustrate exemplary signals in the low intermediate frequency signal processing section 130. FIG. 11A illustrates an example of the output signals of the LPFs 302, and FIG. 11B illustrates an example of the output signals of the BPFs 304. In FIGS. 11A and 11B, the horizontal axis represents the I/Q baseband signal (frequency), and the vertical axis represents the power level of the I/Q signal.

If, for example, the intermediate frequency $f_{IF}$ is 300 kHz in the low intermediate frequency mode, the complex multiplier 303 shifts the frequency spectrum of the intermediate frequency signal having an intermediate frequency $f_{IF}$ of 300 kHz to a lower frequency side by 300 kHz. In this instance, as illustrated in FIG. 11A, the center frequency of the selected channel is positioned at 0 Hz in the intermediate frequency signal subjected to frequency spectrum shift. When the signal bandwidth is 400 kHz per channel, the LPFs 302 pass frequency components not higher than 200 kHz, which is half the signal bandwidth per channel. In such an instance, as illustrated in FIG. 11A, the LPFs 302 pass only an intermediate frequency signal subjected to frequency spectrum shift that is in the signal band of the selected channel. The demodulated signal can be obtained by adding the I and Q signals that have passed through the LPFs 302.

Meanwhile, the BPFs 304 pass only an intermediate frequency signal that has an intermediate frequency $f_{IF}$ of 300 kHz and is in the frequency band, for example, of the upper adjacent channels. If, for instance, a signal on a channel one frequency band higher than the selected channel and a signal on a channel two frequency bands higher than the selected channel are to be passed, the BPFs 304 pass only a signal in a frequency band of 500 kHz to 1300 kHz. In such an instance, as illustrated in FIG. 11B, only the signal on a channel one frequency band higher than the selected channel and the signal on a channel two frequency bands higher than the selected channel pass through the BPFs 304. When the signals that have passed through the BPFs 304 are inputted to the level detector 152, the signal levels of the upper adjacent channels can be detected.

[Reception Procedure]

Figure 12:
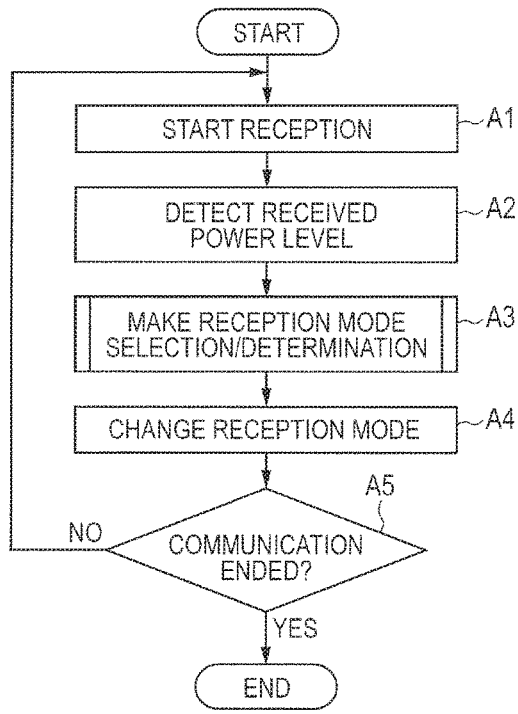
FIG. 12 is a flowchart illustrating a reception procedure performed by the radio receiver.

FIG. 12 illustrates a reception procedure performed by the radio receiver. The radio receiver 100 receives a radio communication signal (step A1). After the radio communication signal is received, the level detectors 151-153 respectively detect signal levels (step A2). The mode control section 108 performs a reception mode selection/determination procedure in accordance with the signal levels detected in step A2 (step A3). If the reception mode (intermediate frequency mode) selected in step A3 is different from a current reception mode, the mode control section 108 outputs a control signal to various sections of the radio receiver 100 in order to switch to the reception mode determined in step A3 (step A4). A control section (not shown) in the radio receiver 100 determines whether reception is ended (step A5). If it is determined that reception is not ended, processing returns to step A1 to continue with the reception of the radio communication signal.

Figure 13:
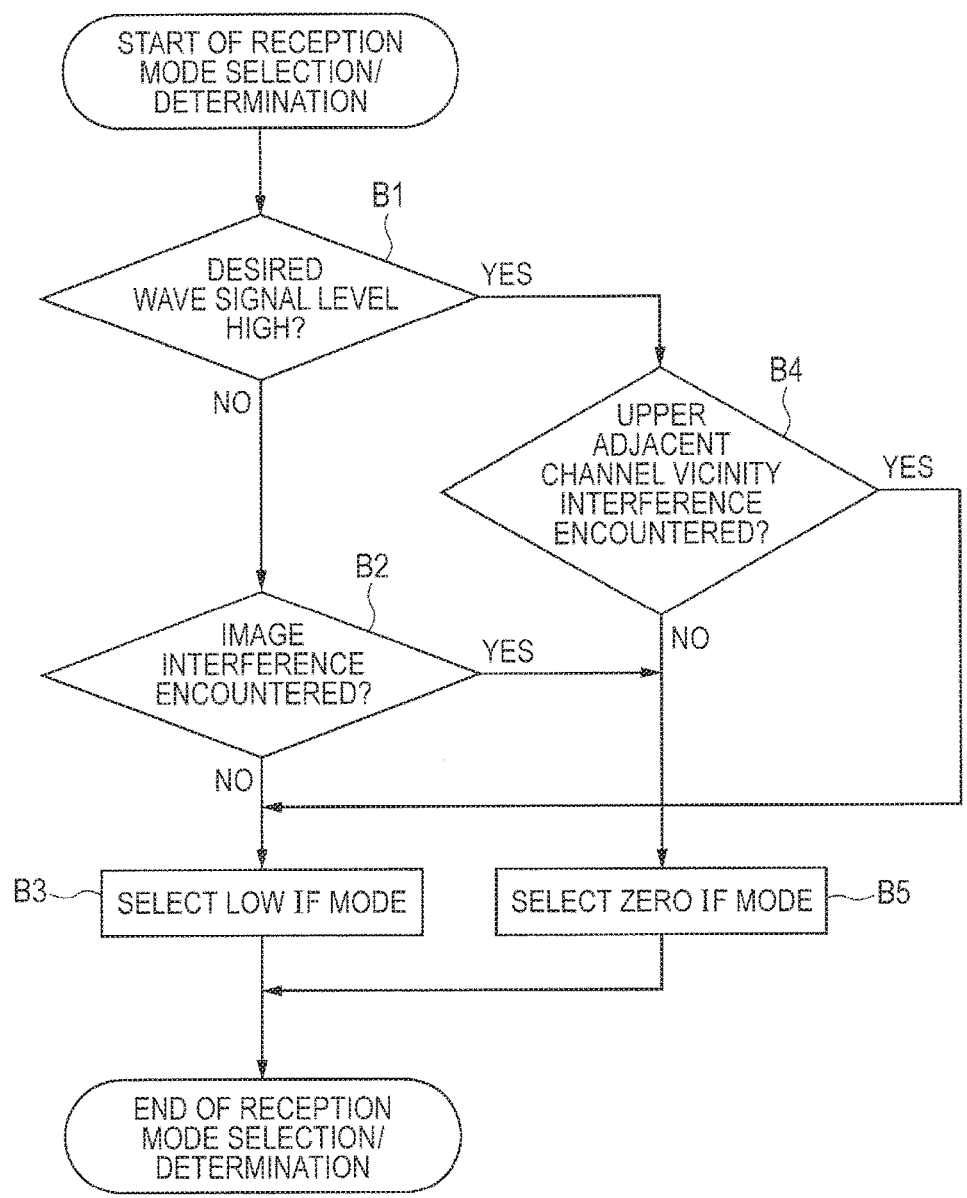
FIG. 13 is a flowchart illustrating a reception mode selection/determination procedure.

FIG. 13 illustrates the reception mode selection/determination procedure. Upon acquiring signal level detection results from the level detectors 151-153, the mode control section 108 determines the signal level of a desired wave (selected channel) signal (step B1). In step B1, the mode control section 108 determines, for example, whether the signal level of a desired wave is higher than a reference power level.

If the signal level of a desired wave at the input end of the radio receiver 100 is a low power level in the vicinity of a minimum receiver sensitivity point, it is necessary to set a high total receive gain VG_T [dB] that includes the gain resulting from amplification by the LNA 102 and the variable gain amplifiers 105. In such an instance, the receiver sensitivity is significantly affected by DC offset and 1/f noise. Therefore, the radio communication signal is preferably received in the low intermediate frequency mode.

Meanwhile, if the signal level of a desired wave at the input end of the radio receiver 100 is high to some extent, the SNR (Signal-to-Noise Ratio) of the desired wave is high. Therefore, the total receive gain can be lowered to reduce the influence of DC offset and 1/f noise. In such an instance, the influence on reception performance is lessened even when the zero intermediate frequency mode is selected as the operating mode. In the zero intermediate frequency mode, the band of the ADCs 106 can be reduced to lower the power consumption.

From the above point of view, if the signal level of a desired wave is low to some extent in terms of input to the radio receiver 100, the low intermediate frequency mode is preferably selected in order to avert the influence of DC offset. If, by contrast, the signal level of a desired wave is high so that the influence of DC offset and 1/f noise is lessened, the zero intermediate frequency mode is preferably selected because the power consumption can be lowered.

For the level determination of a desired wave in step B1, a threshold value Pth_IF [dBm] is set in the vicinity of a boundary of a signal power level affecting the reception performance. The mode control section 108 compares the signal level of a desired wave in terms of input to the radio receiver 100 with the threshold value Pth_IF. If the value of the signal level (signal power level) of the desired wave, which is detected by the level detector 153, is P_LD3 (dBm), the power level P_DC [dBm] of the desired wave in terms of input can be calculated from the following equation:

$$P\_DC[dBm] = P\_LD3[dBm] + VG\_T[dB] \quad \text{(Equation 1)}$$

In step B1, the mode control section 108 determines whether the power level P_DC of the desired wave, which is calculated from Equation 1 above, is lower than the threshold value Pth_IF. More specifically, the mode control section 108 determines whether Equation 2 below is established:

P_DC<Pth_IF (Equation 2)

If Equation 2 above is established, the mode control section 108 determines that the signal level of the desired wave is low and not suitable for reception in the zero intermediate frequency mode. If, by contrast, Equation 2 above is not established, the mode control section 108 determines that the signal level of the desired wave is high and ready for reception in the zero intermediate frequency mode.

If, in step B1, the signal level of the desired wave is determined to be low, the low intermediate frequency mode should be used for reception. However, if an interference wave signal having a power level degrading the receiver sensitivity is present in an image frequency band in the vicinity of an adjacent channel for a lower frequency side (lower side) that is lower in frequency than the desired wave, sufficiently high reception performance may not be obtained even if the low intermediate frequency mode is used for reception. Thus, if the signal level of the desired wave is determined to be low in step B1, the mode control section 108 performs an image interference determination step (step B2). In step B2, the mode control section 108 determines whether, for example, the signal level of the desired wave is sufficiently higher than the signal level of an interference wave in the vicinity of a lower adjacent channel.

In step B2 for image interference determination, the mode control section 108 calculates the signal power level P_ACPL [dBm] of the image frequency band (a frequency band in the vicinity of the lower adjacent channel) in terms of input to the radio receiver 100. The image frequency band is attenuated by the analog filter 104. It is assumed that the amount of attenuation in the image frequency band, which is provided by the analog filter 104, is ATT_LP [dB]. Further, it is assumed that the signal level of an intermediate frequency signal in a wide band, which is detected by the level detector 151, is P_LD1 [dBm], and that the signal level of an upper adjacent channel, which is detected by the level detector 152, is P_LD2 [dBm]. If it is assumed that the total receive gain is VG_T [dB] as stated above, P_ACPL [dBm] can be determined from Equation 3 below:

$$P\_ACPL[dBm] = 10 \cdot LOG_{10}\left(10^{\frac{P\_LD1}{10}} - 10^{\frac{P\_LD2}{10}} - 10^{\frac{P\_LD3}{10}}\right)$$
$$[dBm] + VG\_T[dB] + ATT\_LP[dB]$$
(Equation 3)

If the signal level of the image interference wave is higher than the signal level of the desired wave, reception performance is significantly affected. When the ratio of the signal level of the image interference wave to the signal level of the desired wave is defined as DU_ACPL [dB], DU_ACPL can be determined from Equation 4 below:

DU_ACPL[dB]=P_DC[dBm]−P_ACPL[dBm] (Equation 4)

In step B2 for image interference determination, a determination threshold value DUth_LP [dB] is set with respect to a DU ratio (Desired to Undesired signal ratio) that affects the reception performance. The mode control section 108 compares DU_ACPL determined from Equation 4 with DUth_LP. More specifically, the mode control section 108 determines in step B2 whether Equation 5 below is established:

DU_ACPL>DUth_LP (Equation 5)

If the condition in Equation 5 above is satisfied in step B2, the mode control section 108 determines that no influence is exercised by the image interference wave. In such an instance, the mode control section 108 selects the low intermediate frequency mode (step B3).

If, in step B1, the signal level of the desired wave is determined to be high, reception can be achieved in the zero intermediate frequency mode. However, if the signal level of an interference wave in the vicinity of an adjacent channel is high in both the higher frequency side (upper side) and the lower frequency side (lower side) of the desired wave, which are higher or lower in frequency than the desired wave, the reception performance may degrade due to second-order distortion. Therefore, if any influence is exerted by the interference wave in the vicinity of an adjacent channel, higher reception performance may be obtained when the low intermediate frequency mode is used for reception. Consequently, if it is determined in step B1 that the signal level of the desired wave is high and that reception can be achieved in the zero intermediate frequency mode, the mode control section 108 performs an adjacent channel vicinity interference determination step (step B4).

In step B4, the mode control section 108 determines whether, for example, the signal level of the desired wave is sufficiently higher than the signal level of the interference wave in the vicinity of an adjacent channel. However, the interference wave in the vicinity of a lower adjacent channel may act as an image interference wave signal component even if the low intermediate frequency mode is selected. Therefore, even if the low intermediate frequency mode is selected when the signal level of the interference wave in the vicinity of the lower adjacent channel is high, the reception performance may not improve. For this reason, step B4 is performed to determine whether the signal level of the desired wave is sufficiently higher than the signal level of the interference wave in the vicinity of the upper adjacent channel.

In step B4 for adjacent channel interference determination, the mode control section 108 calculates the signal power level P_ACPU [dBm] of the upper adjacent channel in terms of input to the radio receiver 100. The frequency band on the upper adjacent channel is also attenuated by the analog filter 104, as is the case with the image band. It is assumed that the amount of attenuation in the upper adjacent channel, which is provided by the analog filter 104, is ATT_UP [dB]. If, as stated above, the signal level of the upper adjacent channel, which is detected by the level detector 152, is P_LD2 [dBm] and the total receive gain is VG_T [dB], P_ACPU [dBm] can be determined from the following equation:

P_ACPU[dBm]=P_LD3[dBm]+VG_T[dB]+ATT_UP [dB] (Equation 6)

When the ratio of the signal level of the upper adjacent channel to the signal level of the desired wave is defined as DU_ACPU [dB], DU_ACPU can be determined from Equation 7 below:

DU_ACPU[dB]=P_DC[dBm]−P_ACPU[dBm] (Equation 7)

In step B4 for upper adjacent channel vicinity interference determination, a determination threshold value DUth_UP [dB] is set with respect to the DU ratio that affects the reception performance. The mode control section 108 compares DU_ACPU determined from Equation 7 with DUth_UP. More specifically, the mode control section 108 determines in step B4 whether Equation 8 below is established:

$$DU\_ACPU > DUth\_UP \qquad \text{(Equation 8)}$$

If the condition in Equation 8 above is satisfied in step B4, the mode control section 108 determines that no influence is exercised by an adjacent channel interference wave. In such an instance, the mode control section 108 selects the zero intermediate frequency mode (step B5). If it is determined in step B4 that the condition in Equation 8 above is not satisfied, the mode control section 108 concludes that selecting the zero intermediate frequency mode degrades the reception performance because a significant influence is exerted by the adjacent channel interference wave. In this instance, the mode control section 108 proceeds to step B3 and selects the low intermediate frequency mode.

If it is determined in step B2 that the condition in Equation 5 above is not satisfied, the mode control section 108 concludes that selecting the low intermediate frequency mode instead of the zero intermediate frequency mode does not improve the reception performance because of a significant influence exerted by the image interference wave. In this instance, the mode control section 108 proceeds to step B5 and selects the zero intermediate frequency mode. When the zero intermediate frequency mode is selected, the bandwidth of the ADCs 106 can be reduced. This provides an advantage in terms of power consumption reduction.

[Conclusion]

In the present embodiment, the mode control section 108 selects either the zero intermediate frequency mode or the low intermediate frequency mode in accordance with the radio wave reception conditions. The radio wave reception conditions can be estimated based on the signal levels detected by the level detectors 151-153. In the present embodiment, either the zero intermediate frequency mode or the low intermediate frequency mode is selected in accordance with the relationship between the signal level of the selected wave frequency band and the signal level of an adjacent frequency band that may act as an interference wave. In this manner, maximum reception performance can be obtained under the radio wave reception conditions, which may change with time. As a result, robust communication can be established.

When the present embodiment is compared with Japanese Unexamined Patent Application Publication (Translation of PCT Application) No. 2004-515104 and A 0.6-V Zero-IF/Low-IF Receiver With Integrated Fractional-N Synthesizer For 2.4-GHz ISM-Band Applications, IEEE JOURNAL OF SOLID-STATE CIRCUITS, VOL. 45, NO. 3, Mar. 2010, the latter two documents state that a fixed reception mode is selected for a specific communication method. If, for instance, communication is established in the zero intermediate frequency mode during the use of a certain communication method, the communication is maintained in the zero intermediate frequency mode even when the low intermediate frequency mode is expected to provide improved reception performance. Further, if communication is established in the low intermediate frequency mode during the use of another communication method, the communication is maintained in the low intermediate frequency mode even when reception can be achieved in the zero intermediate frequency mode. Meanwhile, the present embodiment changes the reception mode in accordance with the radio wave reception conditions. Therefore, the present embodiment makes it possible to establish communication in a reception mode that provides high reception performance. Additionally, in a situation where communication can be established in the zero intermediate frequency mode, the power consumption can be reduced by selecting the zero intermediate frequency mode.

Second Embodiment

Figure 14:
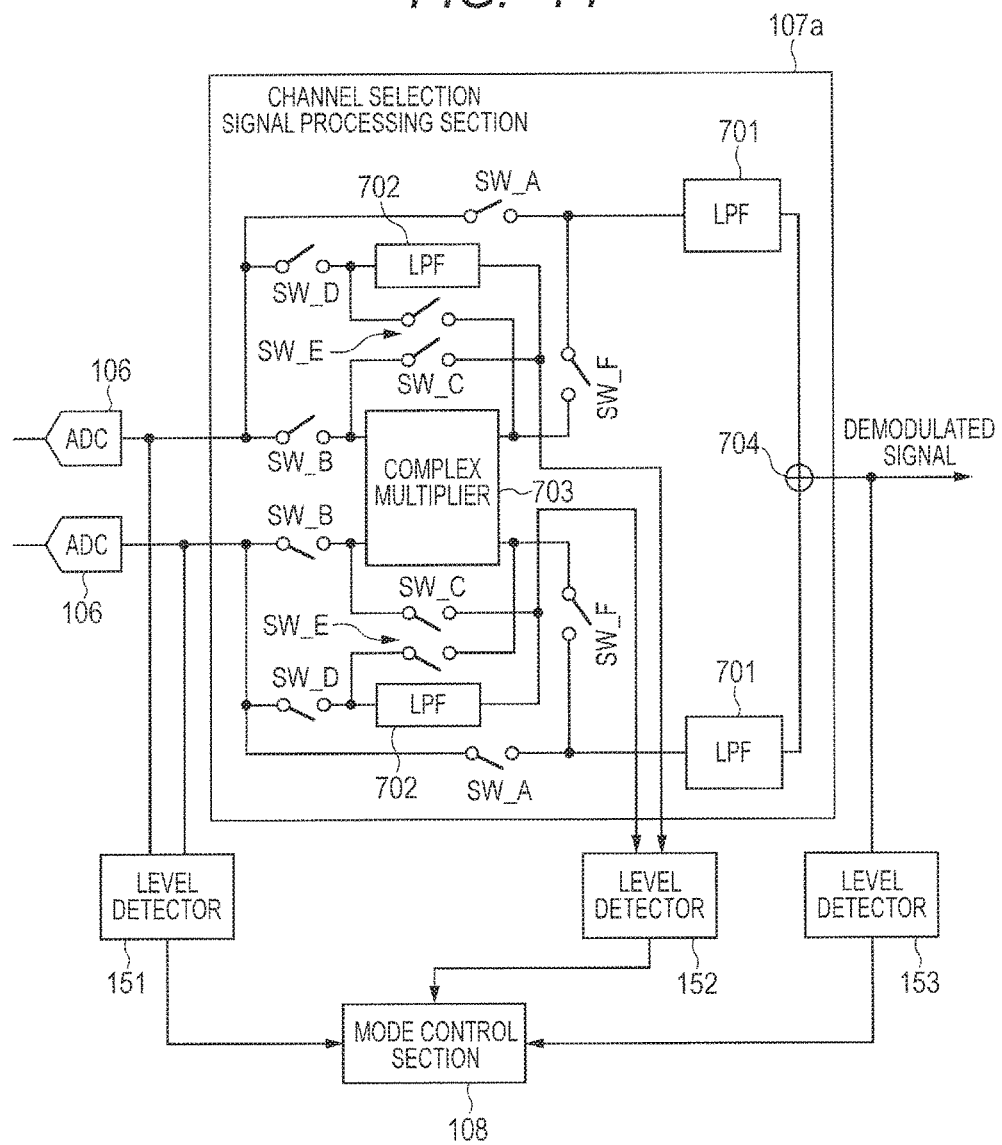
FIG. 14 is a block diagram illustrating an exemplary configuration of a channel selection signal processing section used in the radio receiver according to a second embodiment of the present invention.

A second embodiment of the present invention will now be described. FIG. 14 illustrates an exemplary configuration of a channel selection signal processing section 107a used in the radio receiver according to the second embodiment. The channel selection signal processing section 107a includes two LPFs 701, two LPFs 702, a complex multiplier 703, an adder 704, and switches SW_A-SW_F. Elements other than the channel selection signal processing section 107a in the radio receiver according to the present embodiment may be identical with the elements in the radio receiver 100 according to the first embodiment, which are shown in FIG. 1.

The LPFs (digital filters) 701 pass frequency components of intermediate frequency signals (I and Q signals) that are not higher than the frequency of the selected wave frequency band, and attenuate the other frequency components. The output signals of the LPFs 701 are added together by the adder 704 and outputted as a demodulated signal. The level detector 153 detects the signal level of the demodulated signal that is obtained by allowing the adder 704 to add the output signals of the LPFs 701.

The LPFs (digital filters) 702 pass frequency components of the intermediate frequency signals that are not higher than a predetermined frequency. The LPFs 702 are configured so that their frequency passband is variable. The output signals of the LPFs 702 are inputted to the level detector 152 to let the level detector 152 detect their signal levels. The complex multiplier 703 shifts the frequency spectra of the intermediate frequency signals to a lower frequency side or a higher frequency side by a predetermined frequency. The complex multiplier 703 is configured so that the amount of frequency spectrum shift (frequency shift amount) is variable. The switches SW_A-SW_F are used as path selector switches that change the signal paths of the intermediate frequency signals in the channel selection signal processing section 107a.

The mode control section 108 controls the switching states of the switches SW_A-SW_F in accordance with a selected intermediate frequency mode. Further, in accordance with the selected intermediate frequency mode, the mode control section 108 controls the passbands of the LPFs 702 and the frequency shift amount of the complex multiplier 703. As the present embodiment allows the mode control section 108 to control the switching states of the switches SW_A-SW_F in accordance with the selected intermediate frequency mode, the LPFs, the complex multiplier, and other elements can be used for signal processing of both an intermediate frequency signal having the zero intermediate frequency and an intermediate frequency signal having the low intermediate frequency.

[Operation in Zero Intermediate Frequency Mode]

Figure 15:
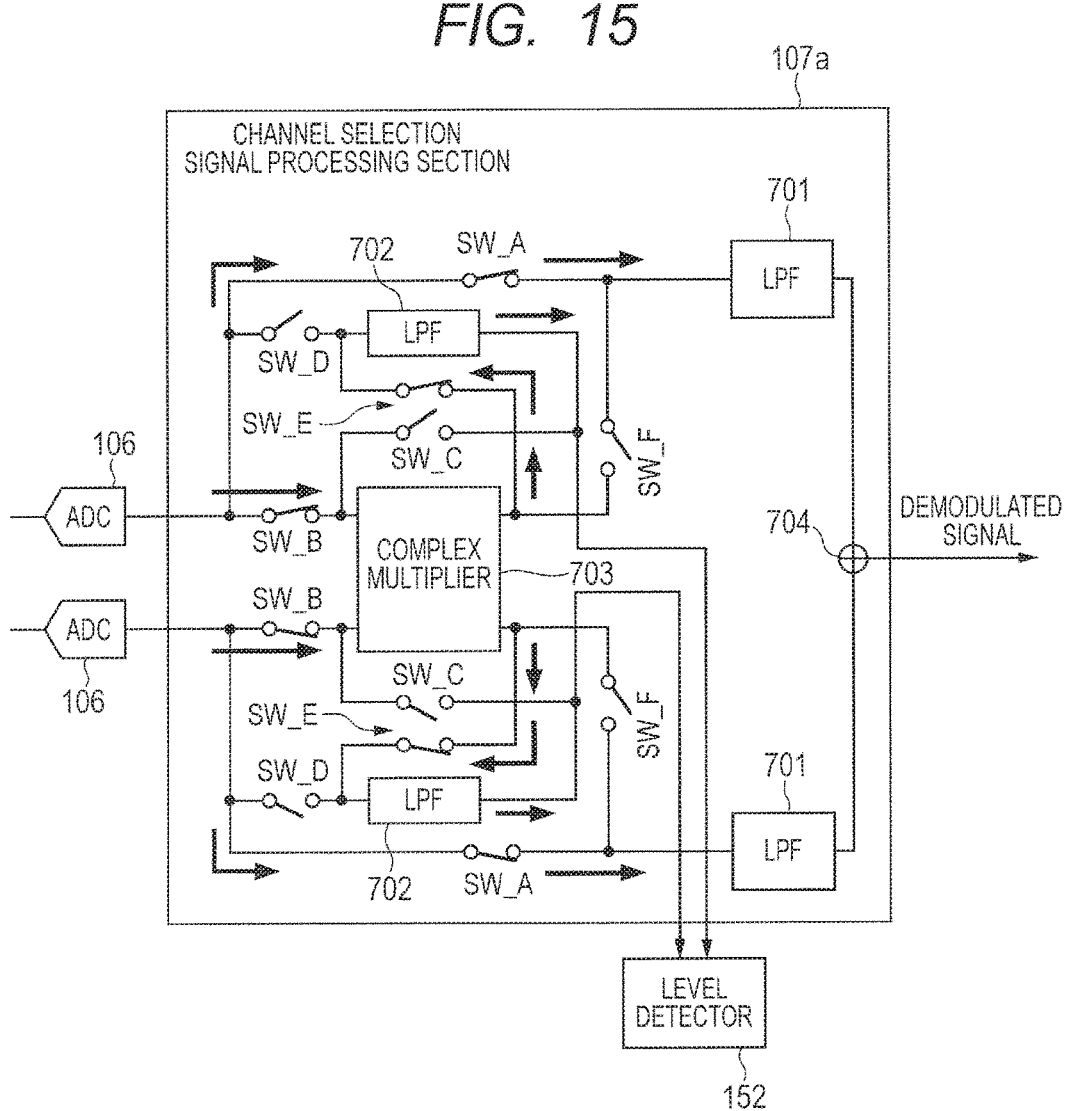
FIG. 15 is a block diagram illustrating an operation that is performed by the channel selection signal processing section in a zero intermediate frequency mode.

FIG. 15 illustrates an operation that is performed by the channel selection signal processing section 107a in the zero intermediate frequency mode. FIG. 15 additionally illustrates the signal paths of the intermediate frequency signals in the channel selection signal processing section 107a. In the zero intermediate frequency mode, the mode control section 108 transmits control signals to the channel selection signal processing section 107a in order to turn on (close) the switches SW_A, SW_B, SW_E and turn off (open) the remaining switches.

The intermediate frequency signals (I and Q signals) outputted from the ADCs 106 are passed through the switches SW_A and inputted to the LPFs 701. The LPFs 701 pass frequency components of the intermediate frequency signals that are inputted through the switches SW_A and not higher than the frequency of the selected wave frequency band, and attenuate the other frequency components. The output signals of the LPFs 701 are added together by the adder 704 and outputted as a demodulated signal.

Further, the intermediate frequency signals (I and Q signals) outputted from the ADCs 106 are passed through the switches SW_B and inputted to the complex multiplier 703. In the zero intermediate frequency mode, the complex multiplier 703 shifts the frequency spectra of the inputted I and Q signals to a lower frequency side or a higher frequency side by a predetermined frequency. The frequency shift amount of the complex multiplier 703 in the zero intermediate frequency mode may be the same as the frequency shift amount of the complex multiplier 203 in the zero intermediate frequency signal processing section 120 shown in FIG. 8. The complex multiplier 703 shifts the frequency spectra of the intermediate frequency signals in such a manner that the frequency band to be extracted as an adjacent channel has a center frequency of 0 Hz.

The output signals of the complex multiplier 703 are passed through the switches SW_D and inputted to the LPFs 702. The LPFs 702 pass frequency components of the intermediate frequency signals that are inputted through the switches SW_D, subjected to frequency spectrum shift, and not higher than a predetermined frequency, and attenuate the other frequency components. The LPFs 702 pass only frequency components not higher than half the frequency in the bandwidth of the frequency band to be extracted, for example, as an adjacent channel. The output signals of the LPFs 702 are inputted to the level detector 152 to let the level detector 152 detect the signal levels of signals that have passed through the LPFs 702.

[Exemplary Signals in Zero Intermediate Frequency Mode]

Figure 16A:
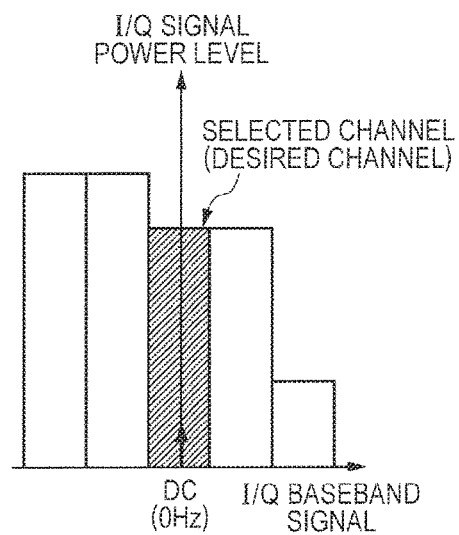
FIGS. 16A to 16D are schematic diagrams illustrating exemplary signals in various sections of the radio receiver.
Figure 16B:
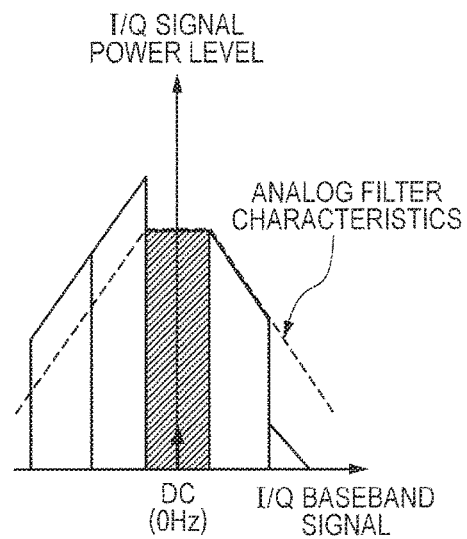
Figure 16C:
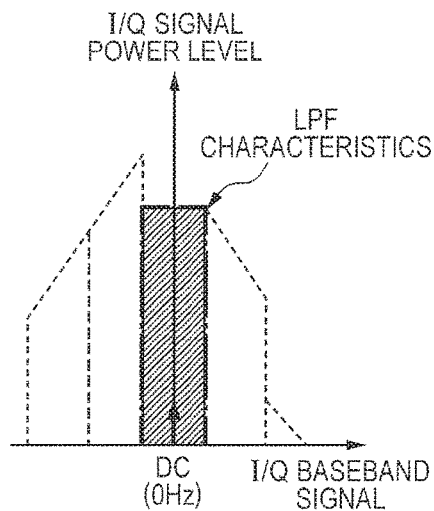
Figure 16D:
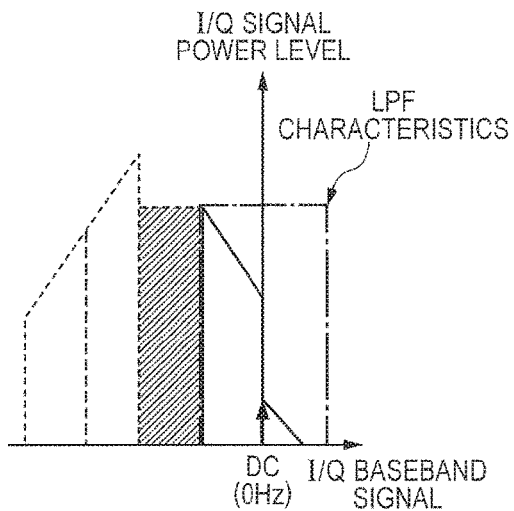

FIGS. 16A to 16D illustrate exemplary signals in various sections of the radio receiver. FIGS. 16A and 16B illustrate exemplary input/output signals of the analog filter 104 (see FIG. 1) in the zero intermediate frequency mode. FIG. 16C illustrates an exemplary output signal of the LPFs 701. FIG. 16D illustrates an exemplary output signal of the LPFs 702. In FIGS. 16A to 16D, the horizontal axis represents the I/Q baseband signal (frequency), and the vertical axis represents the power level of the I/Q signal.

In the zero intermediate frequency mode, the intermediate frequency signals on the selected channel that have a center frequency of 0 Hz are inputted to the analog filter 104 (see FIG. 16A). In the zero intermediate frequency mode, the analog filter 104 functions as a low-pass filter, and the intermediate frequency signals that have passed through the analog filter 104 and are present on the lower and upper adjacent channels are attenuated (see FIG. 16B). In the zero intermediate frequency mode, the signals shown in FIG. 16B are converted to digital signals in the ADCs 106 and inputted to the channel selection signal processing section 107*a*.

The intermediate frequency signals converted to digital signals in the ADCs 106 are inputted to the LPFs 701 through the switches SW_A. If, for example, the signal bandwidth is 400 kHz per channel, the LPFs 701 pass frequency components of the inputted intermediate frequency signals that are not higher than 200 kHz, which is half the signal bandwidth per channel. In such an instance, as illustrated in FIG. 16C, the LPFs 701 pass only an intermediate frequency signal having the zero intermediate frequency in the signal band of the selected channel. The demodulated signal can be obtained by adding the I and Q signals that have passed through the LPFs 701.

Meanwhile, the intermediate frequency signals converted to digital signals in the ADCs 106 are inputted to the complex multiplier 703 through the switches SW_B. In the zero intermediate frequency mode, the complex multiplier 703 shifts the frequency spectra of the intermediate frequency signals to a lower frequency side by 600 kHz.

In this instance, as illustrated in FIG. 16D, the position of 0 Hz in the intermediate frequency signals subjected to frequency spectrum shift is the position of a frequency at the boundary between a channel one frequency band higher than the selected channel and a channel two frequency bands higher than the selected channel. In the zero intermediate frequency mode in which a cut-off frequency, for example, of 400 kHz is set, the LPFs 702 pass frequency components of the shifted intermediate frequency signals that are not higher than 400 kHz. In such an instance, as illustrated in FIG. 16D, the LPFs 702 pass only shifted intermediate frequency signals that are on a channel one frequency band higher than the selected channel or on a channel two frequency bands higher than the selected channel. When the signals that have passed through the LPFs 702 are inputted to the level detector 152, the signal levels of the upper adjacent channels can be detected.

[Operation in Low Intermediate Frequency Mode]

Figure 17:
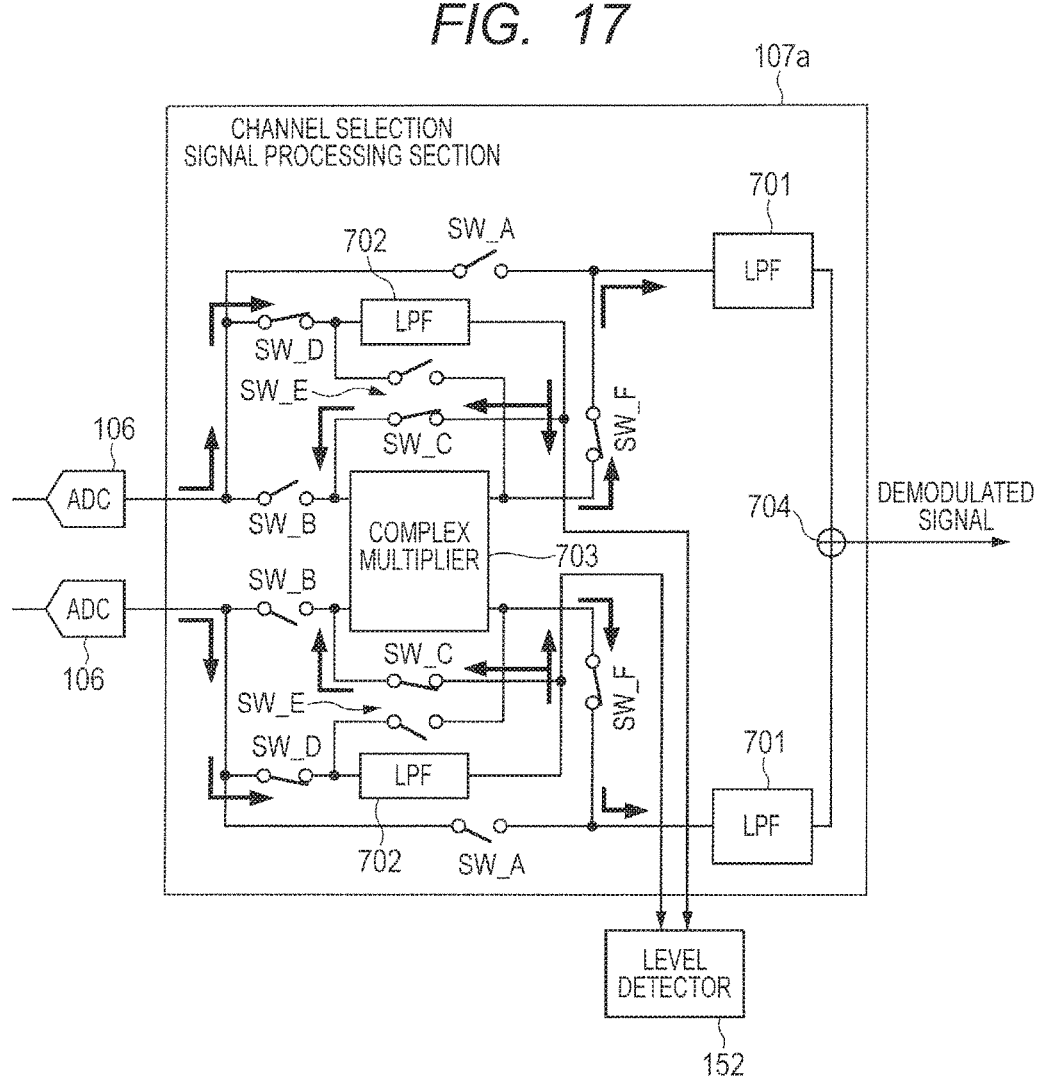
FIG. 17 is a block diagram illustrating an operation that is performed by the channel selection signal processing section in a low intermediate frequency mode.

FIG. 17 illustrates an operation that is performed by the channel selection signal processing section 107*a* in the low intermediate frequency mode. FIG. 17 additionally illustrates the signal paths of the intermediate frequency signals in the channel selection signal processing section 107*a*. In the low intermediate frequency mode, the mode control section 108 transmits control signals to the channel selection signal processing section 107*a* in order to turn on (close) the switches SW_C, SW_D, SW_F and turn off (open) the remaining switches.

The intermediate frequency signals (I and Q signals) outputted from the ADCs 106 are passed through the switches SW_D and inputted to the LPFs 702. The LPFs 702 pass frequency components of the intermediate frequency signals that are inputted through the switches SW_D and not higher than a predetermined frequency, and attenuate the other frequency components. The LPFs 702 pass frequency components of a predetermined frequency band that includes, for example, the selected channel and at least a part of the upper or lower adjacent channels, and attenuate the other frequency components. The output signals of the LPFs 702 are inputted to the level detector 152 to let the level detector 152 detect the signal levels of signals that have passed through the LPFs 702.

The output signals of the LPFs 702 are also inputted to the complex multiplier 703 through the switches SW_C. In the low intermediate frequency mode, the complex multiplier 703 shifts the frequency spectra of the output signals of the LPFs 702, which are inputted through the switches SW_C, to a lower frequency side by the intermediate frequency $f_{IF}$. The intermediate frequency signals subjected in the complex multiplier 703 to frequency spectrum shift to a lower frequency side are inputted to the LPFs 701 through the switches SW_F. The LPFs 701 pass frequency components of the intermediate frequency signals that are subjected to frequency spectrum shift in the complex multiplier 703 and not higher than the frequency of the selected wave frequency band (selected channel), and attenuate the other frequency components. The output signals of the LPFs 701 are added together by the adder 704 and outputted as a demodulated signal.

[Exemplary Signals in Low Intermediate Frequency Mode]

Figure 18A:
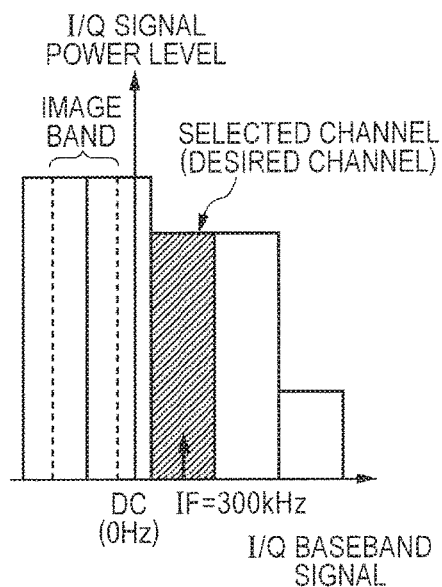
FIGS. 18A to 18D are schematic diagrams illustrating exemplary signals in various sections of the radio receiver.
Figure 18B:
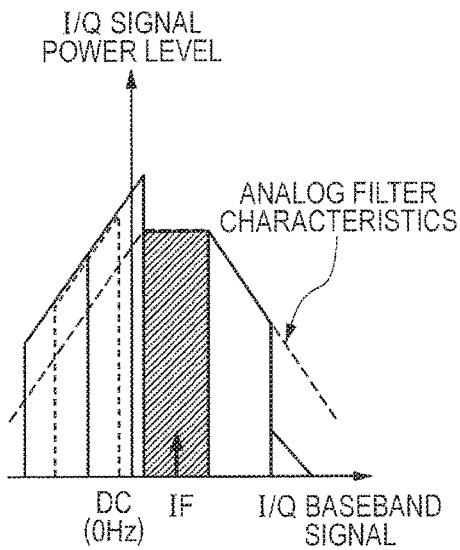
Figure 18C:
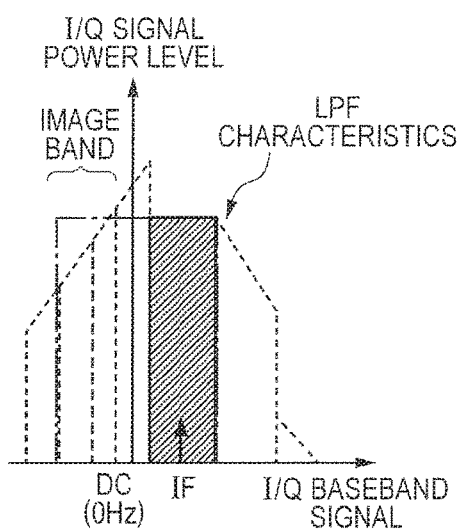
Figure 18D:
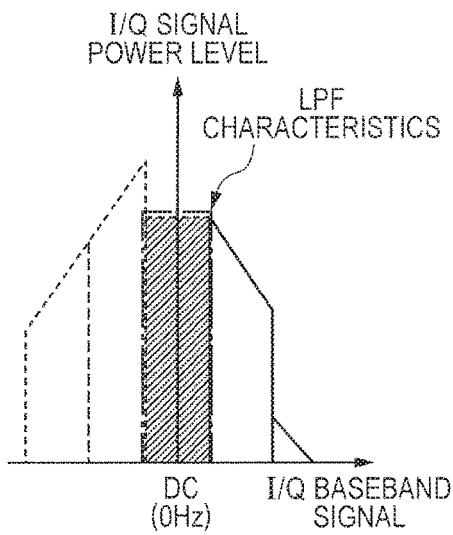

FIGS. 18A to 18D illustrate exemplary signals in various sections of the radio receiver. FIGS. 18A and 18B illustrate exemplary input/output signals of the analog filter 104 (see FIG. 1) in the low intermediate frequency mode. FIG. 18C illustrates an exemplary output signal of the LPFs 702. FIG. 18D illustrates an exemplary output signal of the LPFs 701. In FIGS. 18A to 18D, the horizontal axis represents the I/Q baseband signal (frequency), and the vertical axis represents the power level of the I/Q signal.

In the low intermediate frequency mode, the intermediate frequency signals on the selected channel that have a center frequency of $f_{IF}$ are inputted to the analog filter 104 (see FIG. 18A). The image band of the intermediate frequency signals appears within a minus frequency range. In the low intermediate frequency mode, the analog filter 104 functions as a band-pass filter, and the intermediate frequency signals that have passed through the analog filter 104 and are present on the lower and upper adjacent channels are attenuated (see FIG. 18B). In the low intermediate frequency mode, the signals shown in FIG. 18B are converted to digital signals in the ADCs 106 and inputted to the channel selection signal processing section 107a.

The intermediate frequency signals converted to digital signals in the ADCs 106 are inputted to the LPFs 702 through the switches SW_D. In the low intermediate frequency mode, the LPFs 702 are set to a cut-off frequency of 500 kHz if, for example, the signal bandwidth is 400 kHz per channel and the intermediate frequency $f_{IF}$ is 300 kHz. The LPFs 702 pass frequency components of the intermediate frequency signals shown, for example, in FIG. 18B that are not higher than 500 kHz. In such an instance, as illustrated in FIG. 18C, the LPFs 702 pass the intermediate frequency signals having a low intermediate frequency that is on the selected channel and a part of the intermediate frequency signals having a low intermediate frequency that is on a channel one frequency band lower than the selected channel or on a channel two frequency bands lower than the selected channel. The frequency bands of signals passing through the LPFs 702 generally correspond to the frequency bands of regions A and C, which are shown in FIG. 2. When the signals that have passed through the LPFs 702 are inputted to the level detector 152, the signal levels of the selected channel and lower adjacent channels can be detected.

The signals that have passed through the LPFs 702 are also inputted to the complex multiplier 703 through the switches SW_C. In the low intermediate frequency mode, the complex multiplier 703 shifts the frequency spectra of the intermediate frequency signals to a lower frequency side by the intermediate frequency $f_{IF}$. In this instance, as illustrated in FIG. 16D, the intermediate frequency signals subjected to frequency spectrum shift is such that the center frequency of the selected channel is 0 Hz. When, for example, the signal bandwidth is 400 kHz per channel, the LPFs 701 pass frequency components of the shifted intermediate frequency signals that are not higher than 200 kHz, which is half the signal bandwidth per channel. In such an instance, as illustrated in FIG. 18D, the LPFs 701 pass only intermediate frequency signals subjected to frequency spectrum shift that is in the signal band of the selected channel. The demodulated signal can be obtained by adding the I and Q signals that have passed through the LPFs 701.

Here, in the zero intermediate frequency mode, the level detector 152 detects the signal levels of the upper adjacent channels (see also FIG. 16D). The signal levels of the lower adjacent channels can be calculated from the signal levels detected by the level detector 152, the signal levels detected by the level detector 151 that correspond to the signal level of the whole band of the intermediate frequency signals subjected to analog-to-digital conversion, and the signal level detected by the level detector 153 that corresponds to the signal level of the signal on the selected channel. More specifically, the signal levels of the lower adjacent channels can be determined by eliminating the signal levels detected by the level detector 152 and the signal level detected by the level detector 153 from the signal levels detected by the level detector 151.

Meanwhile, in the low intermediate frequency mode, the level detector 152 generally detects the signal levels of the selected channel and lower adjacent channels (see also FIG. 18C). The signal levels of the upper and lower adjacent channels can be calculated from the signal levels detected by the level detector 152, the signal levels detected by the level detector 151, and the signal level detected by the level detector 153. More specifically, the signal levels of the lower adjacent channels can be determined by eliminating the signal level detected by the level detector 153 from the signal levels detected by the level detector 152. Further, the signal levels of the upper adjacent channels can be determined by eliminating the signal levels detected by the level detector 152 from the signal levels detected by the level detector 151.

[Reception Procedure]

Figure 19:
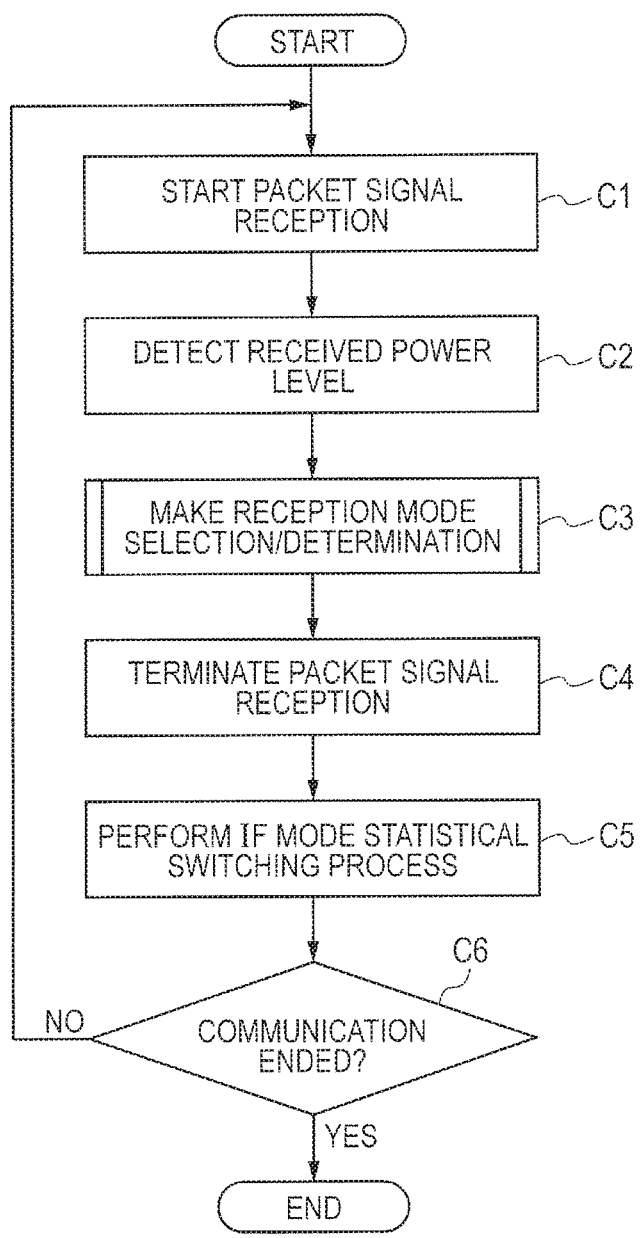
FIG. 19 is a flowchart illustrating a reception procedure performed by the radio receiver according to the second embodiment.

FIG. 19 illustrates a reception procedure performed by the radio receiver according to the present embodiment. Here, it is assumed that the radio receiver receives a radio communication signal on a packet-by-packet basis. It is also assumed that either one of the reception modes is selected for the radio receiver at the beginning of reception (in the initial state). The radio receiver starts to receive a packet signal (step C1). After the start of packet signal reception, the radio receiver allows the level detectors 151-153 to respectively detect signal levels in parallel with a packet reception internal demodulated signal process (step C2). In accordance with the signal levels detected in step C2, the mode control section 108 performs the reception mode selection/determination procedure (step C3). The reception mode selection/determination procedure may be the same as the procedure illustrated in FIG. 13.

If the reception mode (intermediate frequency mode) is changed during packet reception, reception stability becomes impaired. Therefore, it is assumed that the radio receiver changes the reception mode before receiving the next packet signal. However, if the reception mode is changed for each packet reception in a situation where the radio wave reception conditions are such that a factor affecting the reception performance of individual reception modes is in the vicinity of a threshold value, the operation and performance of the radio receiver may not stabilize. In view of the above circumstances, the present embodiment performs statistical processing on the radio wave reception conditions under which a packet signal is received a multiple number of times, and changes the reception mode in accordance with the result of such statistical processing.

The radio receiver ends the reception of a packet signal (step C4). The mode control section 108 performs statistical processing on the reception mode (intermediate frequency mode) selected in step C3, and determines the reception mode for the reception of the next packet signal (step C5). If, for example, a certain reception mode is successively selected a predetermined number of times, the mode control section 108 determines to select that reception mode for the reception of the next packet signal. Alternatively, if the ratio of the selection of a certain reception mode to the results of a predetermined number of reception mode determinations made in the past is not lower than a predetermined ratio, the mode control section 108 may determine that reception mode as the reception mode for the reception of the next packet signal. If the determined reception mode is different from the current reception mode, the mode control section 108 outputs control signals to various sections in the radio receiver in order to switch to the determined reception mode. The control section (not shown) in the radio receiver 100 determines whether reception is ended (step C6). If it is determined that reception is not ended, processing returns to step C1 to start receiving the next packet signal.

[Conclusion]

In the present embodiment, the channel selection signal processing section 107a includes the switches SW_A-SW_F for changing the signal path of the intermediate frequency signals. By changing the selected switching states of the switches SW_A-SW_F, it is possible to use the same LPFs 701, LPFs 702, and complex multiplier 703 in order to implement a signal process for intermediate frequency signals having the zero intermediate frequency and a signal process for intermediate frequency signals having the low intermediate frequency. Therefore, the configuration can be made simpler than when individual signal processing sections are furnished. Further, the present embodiment makes it possible to perform statistical processing on the results of reception mode determinations made based on the radio wave reception conditions and change the reception mode in accordance with the results of reception mode determinations. In this manner, frequent reception mode changes can be avoided to stabilize the operation and reception performance of the radio receiver.

Third Embodiment

Figure 20:
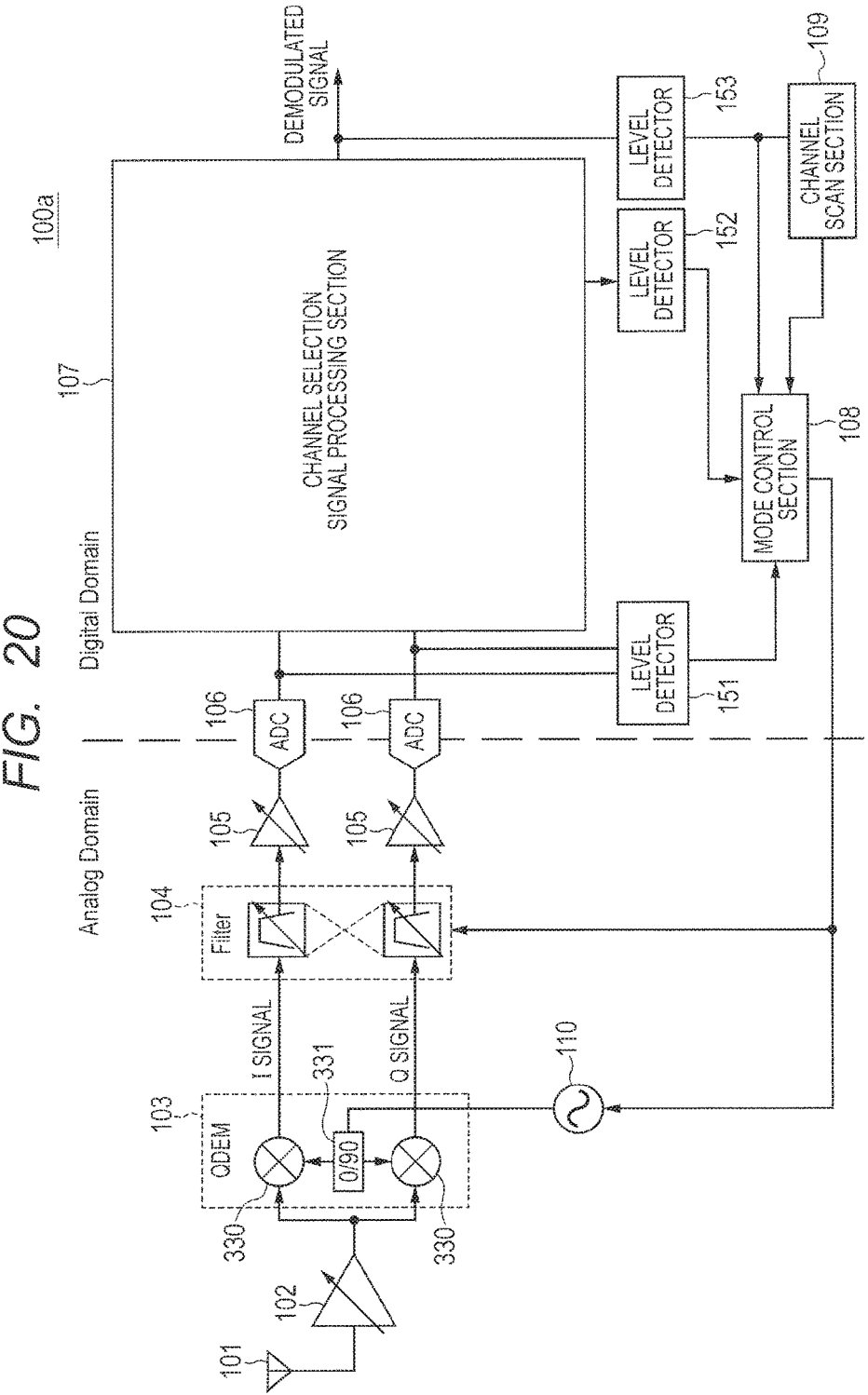
FIG. 20 is a block diagram illustrating the radio receiver according to a third embodiment of the present invention.

A third embodiment of the present invention will now be described. FIG. 20 illustrates the radio receiver according to the third embodiment. The radio receiver 100a according to the present embodiment includes a channel scan section 109 in addition to the elements included in the radio receiver 100 according to the first embodiment, which is shown in FIG. 1. In the present embodiment, radio communication signals include signals on multiple channels, and the channel scan section 109 scans the signal levels of the multiple channels on which communication signals are present. In the present embodiment, the mode control section 108 selects either the zero intermediate frequency mode or the low intermediate frequency mode in accordance with the result of a channel scan performed by the channel scan section 109. In the other respects, the third embodiment may be the same as the first or second embodiment.

Referring, for example, to a radio communication signal arrangement illustrated in FIG. 2, the channel scan section 109 selects one channel at a time from among channels No. 0 to No. 15. The level detector 153 detects the signal levels of signals on the individual channels and notifies the channel scan section 109 of the detected signal levels. The channel scan section 109 notifies the mode control section 108 of identification information indicative of a selected channel and the detected signal level of the selected channel. The mode control section 108 stores the detected signal levels of all channels.

In a radio LAN (Local Area Network) and a wireless PAN (Personal Area Network) that are compliant with IEEE Std 802.15.4g, 802.15.1, 802.15.4, or 802.11, signals on individual communication channels are searched for when an attempt is made to locate a communication partner. In this instance, the detection of the signal power level of a signal compliant with the communication format of a communication system is generally called a Channel Scan, and the detection of the level of a signal incompliant with the communication format is called an Energy Detect. The usage of each channel can be determined by performing a Channel Scan. The presence of an interference wave signal different from signals within the communication system can be determined by performing an Energy Detect. In the present embodiment, these two different level detections are not particularly differentiated and are generically referred to as a Scan.

[Exemplary Signals Obtained by Channel Scan]

Figure 21:
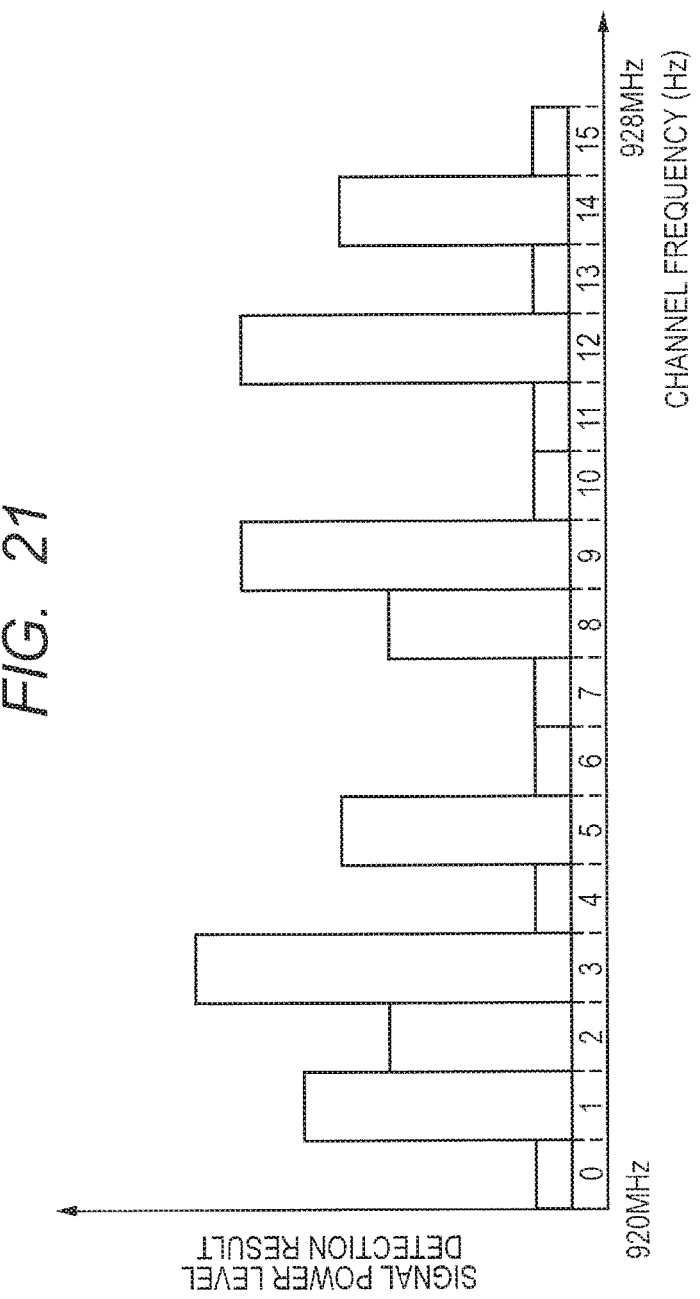
FIG. 21 is a schematic diagram illustrating the signal level of each channel.

FIG. 21 illustrates the signal levels of individual channels that are obtained when a channel scan is performed. Referring to FIG. 21, a channel having a high signal level represents a currently used channel or a channel on which an interference wave is present, and a channel having a low signal level represents an unused channel or a channel on which no interference wave is present. These results of a channel scan are also used, for example, in a channel selection section (not shown). The channel to be used for communication can be selected by referencing the results of a channel scan. Further, it is possible to determine the amount of interference wave components existing in the vicinity of the selected channel.

The above-described channel scan is performed while, for example, the low intermediate frequency mode is selected. The low intermediate frequency mode exhibits better minimum receiver sensitivity characteristics than the zero intermediate frequency mode. Therefore, a channel scan performed in the low intermediate frequency mode achieves signal level detection over a wide range from a low power level to a high power level. The reception mode for a channel scan is not limited to the low intermediate frequency mode. A channel scan may be performed in the zero intermediate frequency mode. The zero intermediate frequency mode reduces the power consumption required for a channel scan.

In the present embodiment, the mode control section 108 selects either the zero intermediate frequency mode or the low intermediate frequency mode in accordance with the results of a channel scan that indicates the signal level of the selected channel, the signal levels of the upper adjacent channels, and the signal levels of the lower adjacent channels. If, for example, channel No. 3 is selected, the mode control section 108 regards the signal level of channel No. 3 as the signal level of the selected wave frequency band, regards the sum of the signal levels of channels No. 4 and No. 5 as the signal level of the upper adjacent channels, and regards the sum of the signal levels of channels No. 1 and No. 2 as the signal level of the lower adjacent channels. In accordance, for example, with the magnitude relationship between the above-mentioned signal levels, the mode control section 108 performs the reception mode selection/determination procedure illustrated, for example, in FIG. 13. In this manner, reception mode selection can be made based on the radio wave reception conditions.

The mode control section 108 may make a reception mode selection based on the above-described results of a channel scan instead of or in addition to reception mode selection/determination based on the results of signal level detection by the level detectors 151-153, which is described in conjunction with the first or second embodiment. When the mode control section 108 merely makes a reception mode selection based on the results of a channel scan, the level detectors 151, 152 may be omitted from the configuration of the radio receiver 100*a* illustrated in FIG. 20.

[Reception Procedure]

Figure 22:
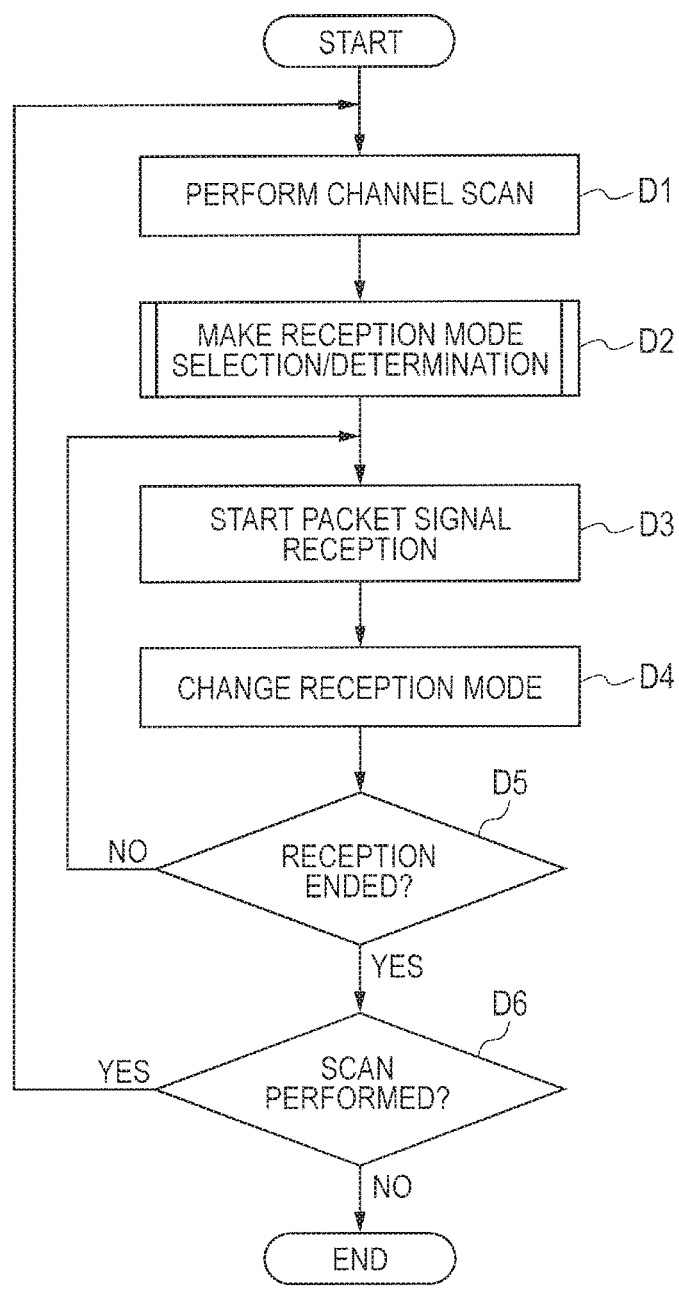
FIG. 22 is a flowchart illustrating a reception procedure performed by the radio receiver according to the third embodiment.

FIG. 22 illustrates a reception procedure performed by the radio receiver according to the present embodiment. The radio receiver 100*a* performs a channel scan before the reception of a packet signal (step D1). In accordance with the result of the channel scan performed in step D1, the mode control section 108 performs the reception mode selection/determination procedure (step D2). The reception mode selection/determination procedure performed in step D2 may be the same as the one described in conjunction with the first embodiment except that the results of a channel scan are used instead of the signal levels detected by the level detectors 151-153.

The radio receiver 100*a* starts to receive a packet signal (step D3). In accordance with the result of reception mode selection/determination in step D2, the mode control section 108 switches to the zero intermediate frequency mode or the low intermediate frequency mode (step D4). The ratio receiver 100*a* determines whether reception is ended (step D5). If the reception is not ended, processing returns to step D3 in order to receive the next packet signal.

If it is determined in step D5 that the reception is ended, the radio receiver 100*a* determines whether or not to perform a channel scan (step D6). If, for example, the communication channel is to be changed, the radio receiver 100*a* determines to perform a channel scan. If it is determined in step D5 that a channel scan is to be performed, processing returns to step D1 in order to let the channel scan section 109 perform a channel scan.

[Conclusion]

In the present embodiment, the channel scan section 109 performs a channel scan, and the mode control section 108 selects either the zero intermediate frequency mode or the low intermediate frequency mode in accordance with the results of a channel scan. By referencing the results of a channel scan, it is possible to acquire the signal levels of channels adjacent to the selected channel and estimate interference wave power conditions of the adjacent channels. Using the result of such estimation makes it possible to select a reception mode suitable for the radio wave reception conditions.

[Exemplary Modification]

Figure 23:
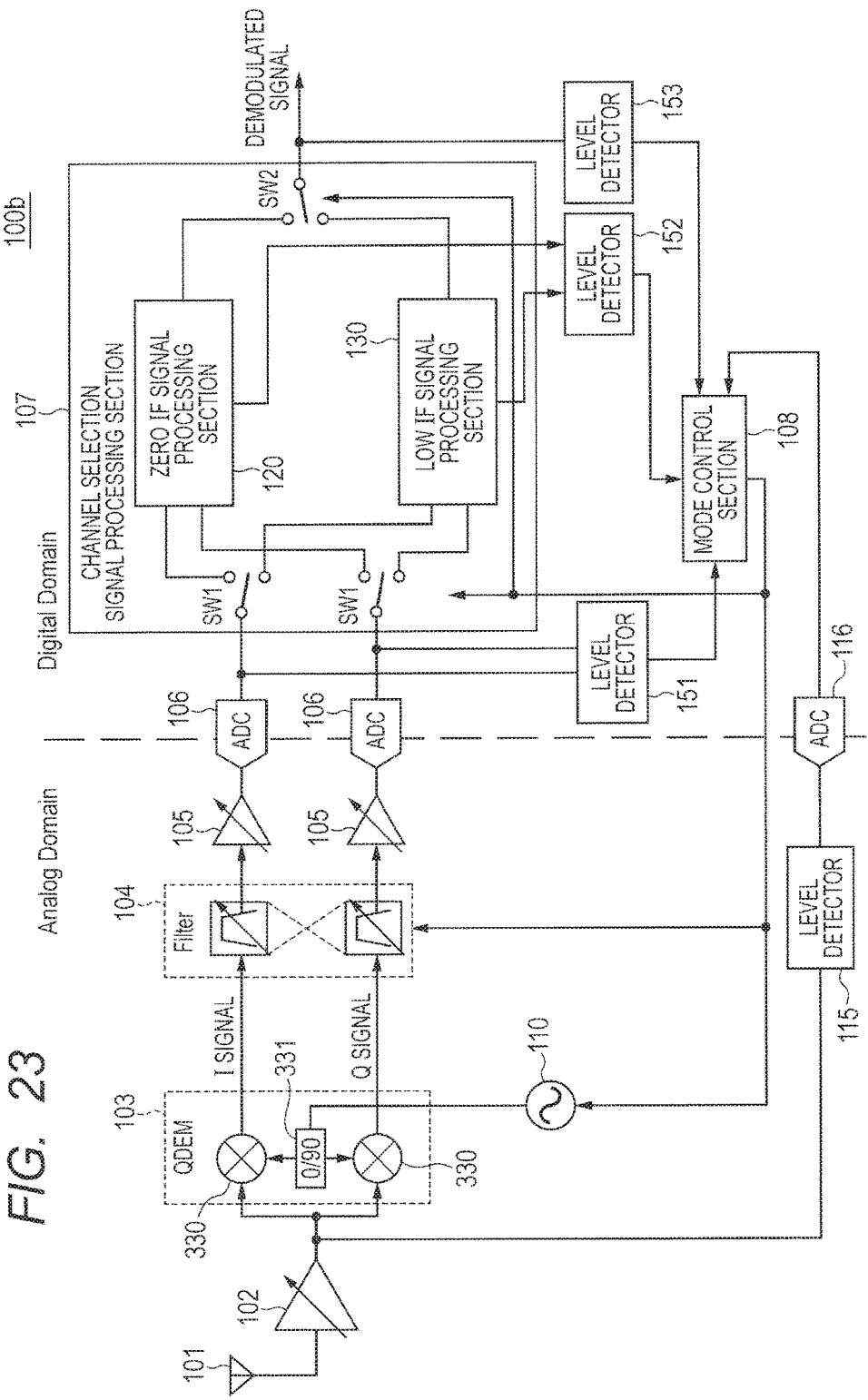
FIG. 23 is a block diagram illustrating the radio receiver according to an exemplary modification.

An exemplary modification will now be described. FIG. 23 illustrates the radio receiver according to the exemplary modification. The radio receiver 100*b* according to the present exemplary modification includes a level detector 115 and an ADC 116 in addition to the elements included in the radio receiver 100 according to the first embodiment, which is shown in FIG. 1. In the other respects, the exemplary modification may be the same as the first to third embodiments.

In an analog domain, the level detector 115 (level detector 4) detects the signal level of a radio communication signal outputted from the LNA 102. The level detector 115 detects the signal level of the radio communication signal before the radio communication signal is converted to an intermediate frequency signal, for example, in the quadrature demodulator 103. The level detector 115 outputs, as a detected signal, a signal having a magnitude dependent on the magnitude of the detected signal level. The ADC 116 receives the detected signal outputted from the level detector 115 and converts the received detected signal to a digital signal. The mode control section 108 stores the signal detected by the level detector 115 that is converted to the digital signal by the ADC 116.

In the present exemplary modification, the mode control section 108 performs the reception mode selection/determination procedure by additionally using the detected signal outputted from the level detector 115 (the result of signal level detection). More specifically, for example, in the zero intermediate frequency mode, the mode control section 108 calculates the ratio between the signal level detected by the level detector 115 and the signal level detected by the level detector 153, and compares the calculated ratio with a predetermined threshold value. If the calculated ratio is higher than the threshold value, the mode control section 108 changes the reception mode from the zero intermediate frequency mode to the low intermediate frequency mode.

The mode control section 108 may make a reception mode selection based on the signal levels detected by the level detector 115 and the level detector 153 in the zero intermediate frequency mode, and may make a reception mode selection based on the signal levels detected by the level detectors 151-153 in the low intermediate frequency mode. In such an instance, the mode control section 108 may stop the operations of unused level detectors 151, 152 in the zero intermediate frequency mode. Further, the mode control section 108 may stop the operation of an unused level detector 115 in the low intermediate frequency mode. Stopping the operations of unused level detectors avoids unnecessary power consumption.

[Range of Detection by Level Detector 115]

Figure 24:
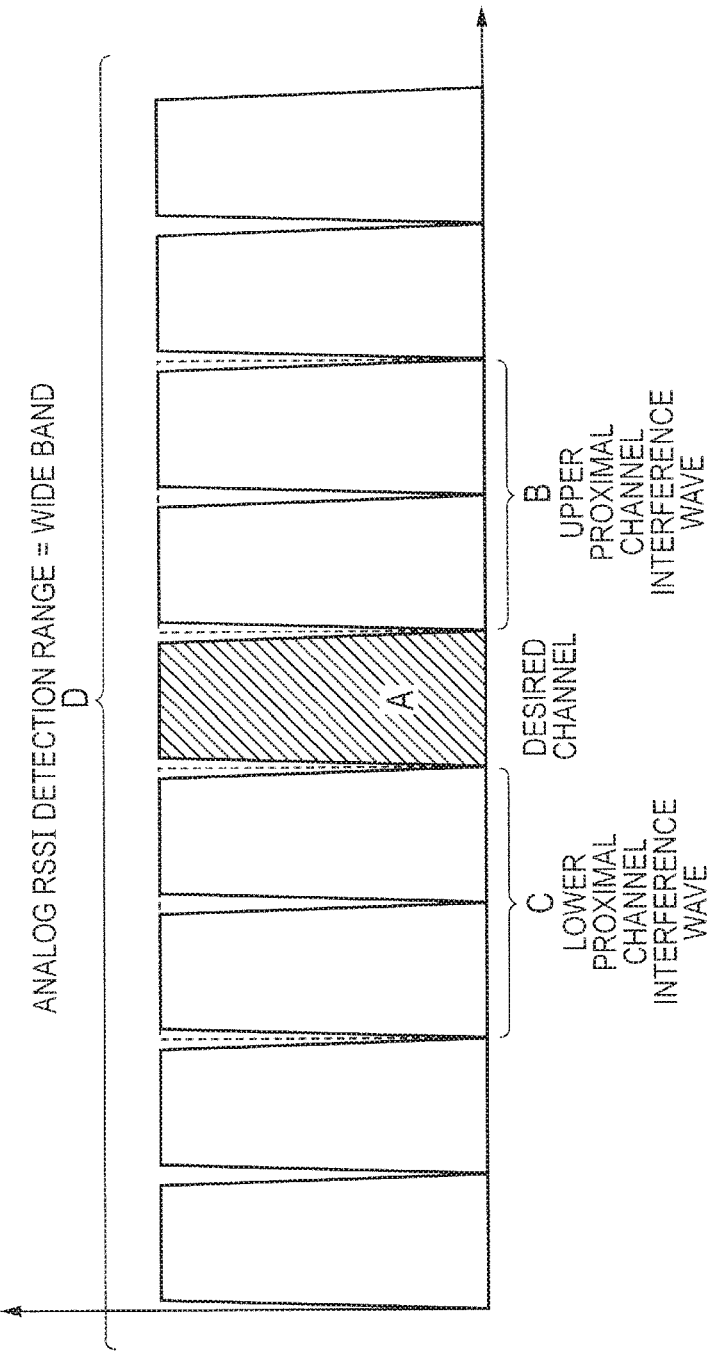
FIG. 24 is a schematic diagram illustrating a frequency band of the radio communication signals.

FIG. 24 illustrates the frequency band of radio communication signals detected by the level detector 115. The range of frequency of radio communication signals to be detected by the level detector 115 depends on the output gain frequency characteristics of the LNA 102. In general, however, within an RF (Radio Frequency) band, level detection is often achievable over a wide band ranging from several tens of megahertz to several hundreds of megahertz. The frequency detection region of the level detector 115, which is an RF band signal power level detector, coordinates with the output bandwidth of the LNA 102 and is a wider region D including upper adjacent channels (region B) and lower adjacent channels (region C), which are adjacent to the selected wave frequency band (region A). For example, the level detector 115 is capable of detecting the signal level of all channels shown in FIG. 2, that is, the signal level of a communication band ranging from 920 MHz to 928 MHz. A band-pass filter for passing a predetermined frequency band may be disposed at the input stage of the level detector 115 in order to limit the frequency band within which the level detector 115 achieves signal level detection.

[Reception Procedure]

Figure 25:
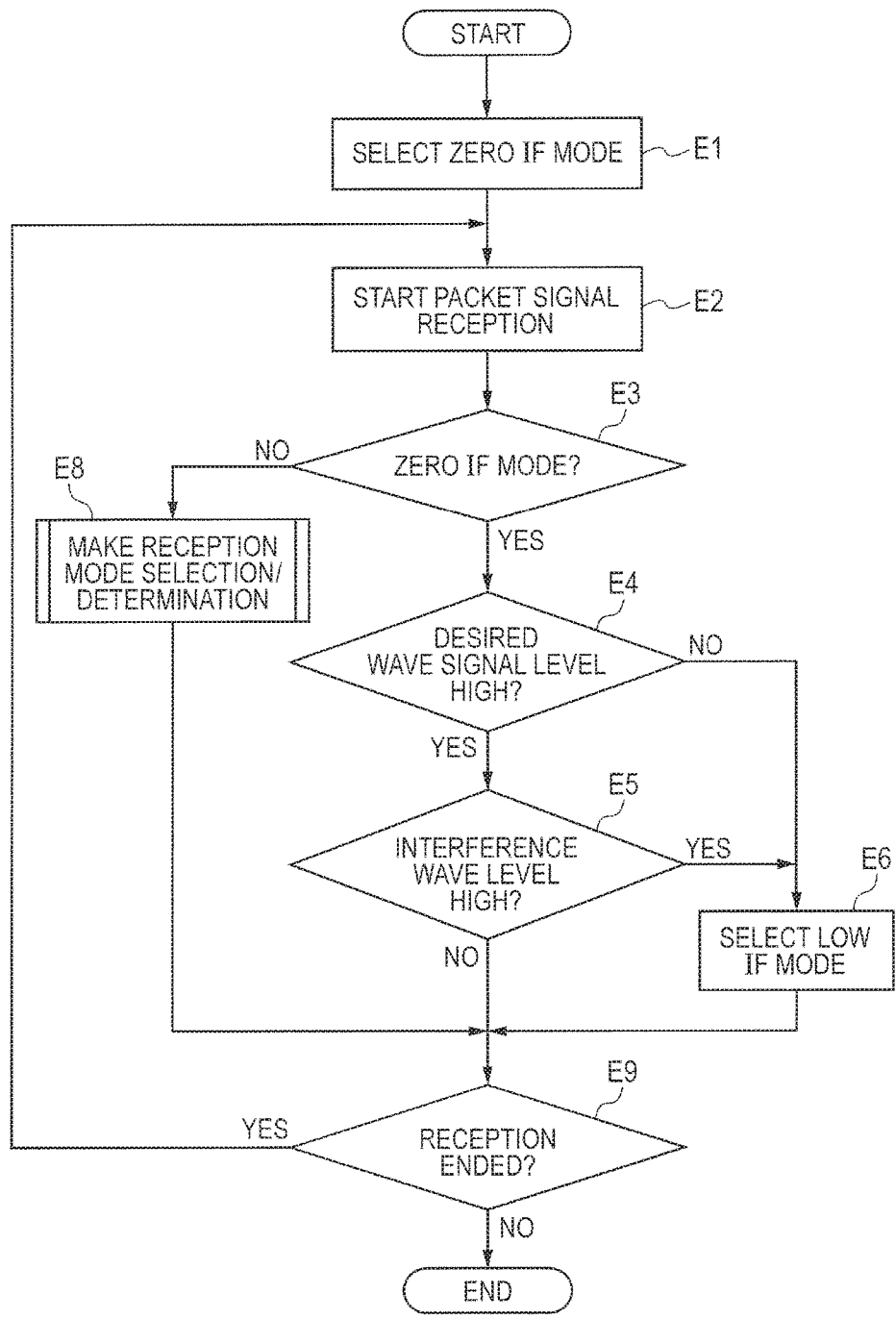
FIG. 25 is a flowchart illustrating a reception procedure performed by the radio receiver according to the exemplary modification.

FIG. 25 is a flowchart illustrating a reception procedure performed by the radio receiver 100*b* according to the present exemplary modification. By default, the mode control section 108 selects the zero intermediate frequency mode (step E1). The mode control section 108 stops the operations of the level detectors 151, 152 and operates the level detector 115. The level detector 115 detects the signal level of a radio communication signal, and the level detector 153 detects the signal level of the selected channel. The signal level of the radio communication signal, which is detected by the level detector 115, is designated by D [dBm], and the signal level of a radio communication signal, which is detected by the level detector 153, is designated by A [dBm]. In the zero intermediate frequency mode, the bandwidth of the ADCs 106 is narrowed.

The radio receiver 100*b* starts to receive a packet signal (step E2). The mode control section 108 determines whether the zero intermediate frequency mode is currently selected as the reception mode (step E3). At the beginning of communication, the zero intermediate frequency mode is selected in step E1. Therefore, the mode control section 108 determines that the zero intermediate frequency mode is currently selected as the reception mode. If it is determined in step E3 that the zero intermediate frequency mode is currently selected as the reception mode, the mode control section 108 determines the signal level of a desired wave (selected channel) in accordance with the signal level detected by the level detector 153 (step E4). In step E4, the mode control section 108 determines whether, for example, the signal level of the desired wave is higher than a reference power level.

In step E4, the signal level of the desired wave may be determined in the same manner as for determining the signal level of the desired wave in step B2, which is shown in FIG. 13. In step E4, the mode control section 108 compares the power level P_DC of the desired wave, which is calculated from conversion indicated in Equation 1, with a threshold value Pth_IF in order to determine whether the equation P_DC <Pth_IF is established. If the above equation is established, the mode control section 108 determines that the signal level of the desired wave is low, and selects the low intermediate frequency mode (step E6). Upon selecting the low intermediate frequency mode, the mode control section 108 operates the level detectors 151, 152, and stops the operation of the level detector 115. In the low intermediate frequency mode, the bandwidth of the ADCs 106 is widened. During the interval between the end of a current packet signal reception and the reception of the next packet signal, the mode control section 108 switches to the low intermediate frequency mode.

If the above equation is not established, the mode control section 108 determines that the signal level of the desired wave is high, and concludes that reception is achievable in the zero intermediate frequency mode. In this instance, the mode control section 108 proceeds to perform an RF power determination procedure in accordance with the signal level detected by the level detector 115 and the signal level detected by the level detector 153 in order to determine whether the level of an interference wave signal is high (step E5).

In step E5, the mode control section 108 determines the level of the interference wave signal in accordance, for example, with the ratio between signal level D [dBm], which is detected by the level detector 115, and signal level A [dBm], which is the signal level of the desired wave detected by the level detector 153. The relationship between signal level D [dBm] and signal level A [dBm] is expressed by the equation A [dBm] =D [dBm] when there is no interference wave for the signal level of the desired wave. The value of D−A [dB] indicative of the ratio between the above two signal levels increases with an increase in the number of interference wave signals.

When the RF power determination procedure is to be performed in step E5, a determination threshold value DUth_RF [dB] is set for the DU ratio of the signal power level at which communication is affected by an enlarged interference wave signal. In step E5, the mode control section 108 compares the value of D−A [dB] with the determination threshold value DUth_RF. More specifically, the mode control section 108 determines whether Equation 9 below is established.

$$D-A[dB] > DUth\_RF[dB] \quad \text{(Equation 9)}$$

If the condition in Equation 9 above is satisfied in step E5, the mode control section 108 determines that the signal level of an interference wave is high. In this instance, the mode control section 108 proceeds to step E6 and selects the low intermediate frequency mode. Upon selecting the low intermediate frequency mode, the mode control section 108 operates the level detectors 151, 152, and stops the operation of the level detector 115. When the level detectors 151, 152 operates, the reception mode selection/determination can be made by additionally using the signal levels of adjacent channels corresponding to regions B and C shown in FIG. 24. In the low intermediate frequency mode, the bandwidth of the ADCs 106 is widened.

The radio receiver 100a determines whether reception is ended (step E9). If the reception is not ended, processing returns to step E2 in order to receive the next packet signal.

If the reception mode is changed to the low intermediate frequency mode during reception, the mode control section 108 determines in step E3 that the zero intermediate frequency mode is not currently selected. In this instance, the mode control section 108 performs the reception mode selection/determination procedure (step E8). The reception mode selection/determination procedure to be performed in step E8 may be the same as the one illustrated in FIG. 13. If the zero intermediate frequency mode is selected in step E8, the mode control section 108 switches to the zero intermediate frequency mode after the end of a current packet signal reception.

[Conclusion]

In the present exemplary modification, the level detection section 115 detects the signal level of a radio communication signal in the analog domain, and the mode control section 108 makes a reception mode selection by additionally using the signal level of the radio communication signal, which is detected by the level detector 115. In particular, in the zero intermediate frequency mode, the mode control section 108 determines the reception mode by using the results of signal level detection by the level detectors 115, 153. When the mode control section 108 stops the operations of the level detectors 151, 152 in the zero intermediate frequency mode, the power consumption is further reduced because of their stopped operations.

[Radio Transceiver]

Figure 26:
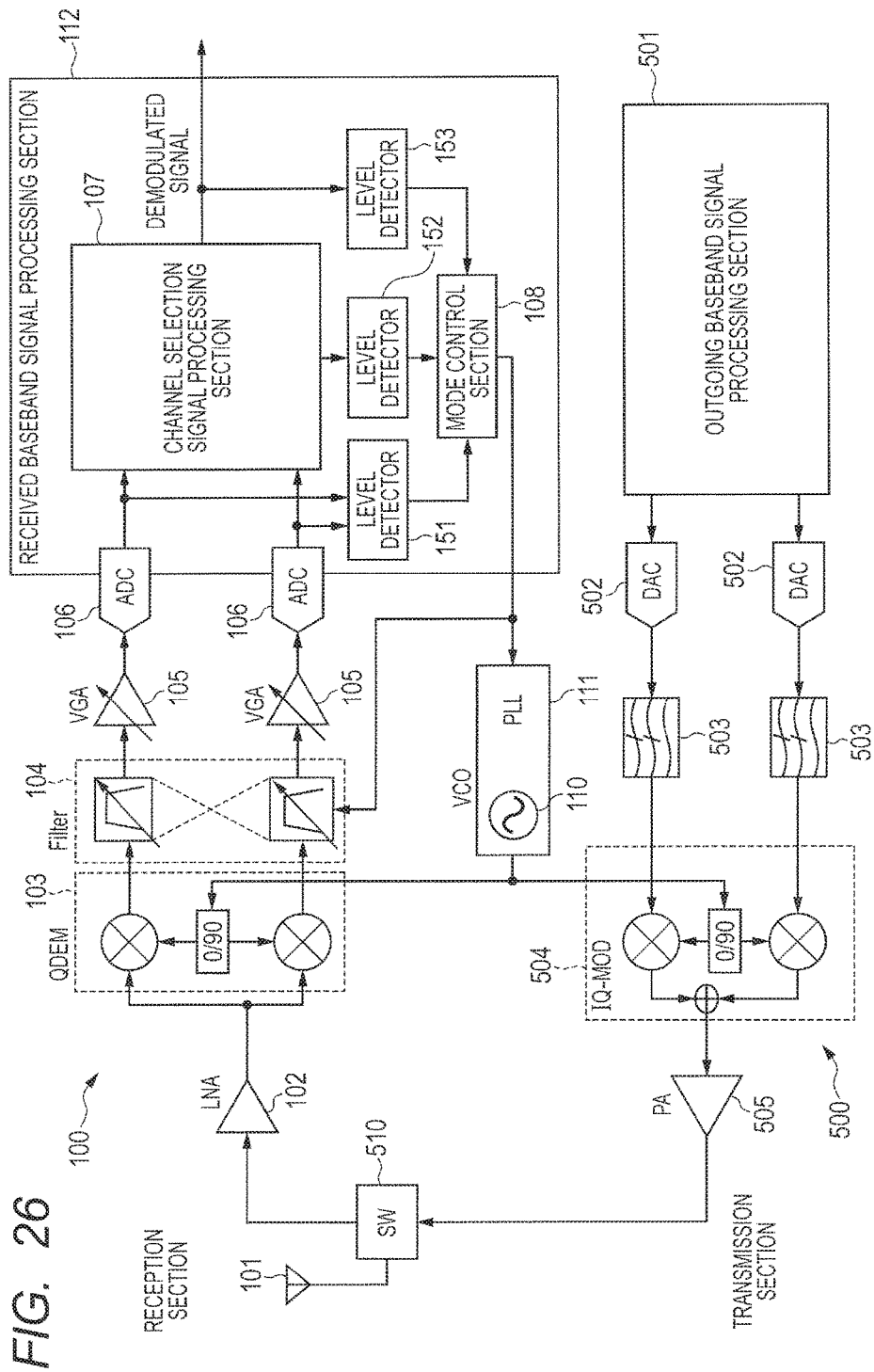
FIG. 26 is a block diagram illustrating a radio transceiver having a radio receiver and a radio transmitter.

FIG. 26 illustrates a radio transceiver having a radio receiver and a radio transmitter. The radio transceiver includes a reception section (radio receiver) 100 and a radio transmitter 500. The radio receiver 100 shown in FIG. 26 may have the same configuration as the radio receiver 100 according to the first embodiment, which is shown in FIG. 1. The reception section used in the radio receiver may be the same as the radio receiver according to the second embodiment, the third embodiment, the exemplary modification, or an appropriate combination of the embodiments and exemplary modification. In the radio receiver 100, the oscillator 110 is included in a PLL circuit 111 to output a local oscillation signal that is synchronized with a predetermined phase. A switch 510 switches between the transmission and reception of a radio communication signal. When a radio communication signal is received, the switch 510 outputs the radio communication signal received by the antenna 101 to the LNA 102.

The radio transmitter 500 includes an outgoing baseband signal processing section 501, a DAC (Digital-to-Analog Converter) 502, a filter 503, a quadrature modulator 504, and a PA (Power Amplifier) 505. The outgoing baseband signal processing section 501 is disposed in the digital domain to generate an outgoing baseband signal. The outgoing baseband signal generated by the outgoing baseband signal processing section 501 is passed through the filter 503 and then inputted to the quadrature modulator 504. The quadrature modulator 504, which includes a phase shifter and a frequency mixer, generates modulated signals, which are orthogonal to each other, by mixing a local oscillation signal outputted from the oscillator 110 with an outgoing baseband oscillation signal. The PA 505 amplifies the generated modulated signals. When a radio communication signal is to be transmitted, the switch 510 supplies to the antenna 101 the amplified modulated signals outputted from the PA 505.

The description given with reference to FIG. 10 assumes that the LPFs 301 are disposed at the input stage of the complex multiplier 303 in the low intermediate frequency signal processing section 130. However, the low intermediate frequency signal processing section 130 is not limited to such a configuration. The LPFs 301 may be omitted from the low intermediate frequency signal processing section 130. The I and Q signals having a low intermediate frequency, which are converted to digital signals by the ADCs 106, may be inputted to the complex multiplier 303. Further, the description given with reference to FIG. 8 assumes that the I and Q signals having a zero intermediate frequency, which are converted to digital signals by the ADCs 106, may be inputted to the complex multiplier 203 in the zero intermediate frequency signal processing section 120. However, the zero intermediate frequency signal processing section 120 is not limited to such a configuration. The zero intermediate frequency signal processing section 120 may be provided with an additional LPF at the input stage of the complex multiplier 203, and configured to input the signals to the complex multiplier 203 through the additional LPF. In such an instance, the LPF disposed at the input stage of the complex multiplier 203 may pass frequency components not higher than the frequency that is obtained, for example, by adding a bandwidth approximately half the selected wave frequency band to the signal bandwidth of the channel to be extracted as an adjacent channel, and attenuate the other frequency components.

While the present invention made by its inventors has been described in detail in terms of specific embodiments, the present invention is not limited to such foregoing embodiments. It is to be understood by those skilled in the art that various modifications can be made without departing from the spirit and scope of the present invention. For example, the foregoing embodiments and the exemplary modification may be combined as appropriate.

What is claimed is:

1. A radio receiver, comprising:
    an oscillator that has a variable oscillation frequency;
    a quadrature demodulator that includes a frequency mixer and generates an intermediate frequency signal having an intermediate frequency lower than a frequency of a radio frequency signal, the frequency mixer mixing the radio frequency signal with an oscillation signal outputted from the oscillator;
    an analog filter that bandlimits the intermediate frequency signal;
    an analog-to-digital converter that receives an intermediate frequency signal inputted through the analog filter and converts the received intermediate frequency signal to a digital signal;
    a received signal processing section that generates a demodulated signal from the intermediate frequency signal converted to the digital signal; and
    a mode control section that switches the operating mode of the quadrature demodulator between a zero intermediate frequency mode and a low intermediate frequency mode in accordance with radio wave reception conditions, the zero intermediate frequency mode providing the intermediate frequency signal having a zero intermediate frequency, the low intermediate frequency mode providing the intermediate frequency signal having a low intermediate frequency higher than the zero intermediate frequency,
    wherein, in the zero intermediate frequency mode, the analog filter passes frequency components of the intermediate frequency signal that are not higher than a predetermined frequency, and in the low intermediate frequency mode, the analog filter passes signal components of the intermediate frequency signal that have a frequency band including a frequency of the intermediate frequency signal.

2. The radio receiver according to claim 1, wherein the mode control section selects the zero intermediate frequency mode or the low intermediate frequency mode in accordance with a signal level of a selected wave frequency band including the demodulated signal and with a signal level of a frequency band other than the selected wave frequency band.

3. The radio receiver according to claim 2, wherein the mode control section determines whether the signal level of the selected wave frequency band is lower than a first threshold value, and
    wherein, if the signal level of the selected wave frequency band is determined to be not lower than the first threshold value, the mode control section selects the zero intermediate frequency mode.

4. The radio receiver according to claim 3, wherein, if the signal level of the selected wave frequency band is determined to be not lower than the first threshold value, the mode control section further determines whether a ratio between the signal level of the selected wave frequency band and the signal level of an upper adjacent frequency band is greater than a second threshold value, the upper adjacent frequency band being higher than and adjacent to the selected wave frequency band of the intermediate frequency signal,
    wherein, if the ratio between the signal level of the selected wave frequency band and the signal level of the upper adjacent frequency band is determined to be greater than the second threshold value, the mode control section selects the zero intermediate frequency mode, and
    wherein, if the ratio between the signal level of the selected wave frequency band and the signal level of the upper adjacent frequency band is determined to be not greater than the second threshold value, the mode control section selects the low intermediate frequency mode.

5. The radio receiver according to claim 3, wherein, if the signal level of the selected wave frequency band is determined to be lower than the first threshold value, the mode control section further determines whether a ratio between the signal level of the selected wave frequency band and the signal level of a lower adjacent frequency band is greater than a third threshold value, the lower adjacent frequency band being lower than and adjacent to the selected wave frequency band of the intermediate frequency signal,
    wherein, if the ratio between the signal level of the selected wave frequency band and the signal level of the lower adjacent frequency band is determined to be greater than the third threshold value, the mode control section selects the low intermediate frequency mode, and wherein, if the ratio between the signal level of the selected wave frequency band and the signal level of the lower adjacent frequency band is determined to be not greater than the third threshold value, the mode control section selects the zero intermediate frequency mode.

6. The radio receiver according to claim 1, wherein the received signal processing section includes:
a zero intermediate frequency signal processing section that generates a demodulated signal from an intermediate frequency signal having the zero intermediate frequency, the intermediate frequency signal being converted to a digital signal by the analog-to-digital converter; and
a low intermediate frequency signal processing section that generates a demodulated signal from an intermediate frequency signal having the low intermediate frequency, the intermediate frequency signal being converted to a digital signal by the analog-to-digital converter.

7. The radio receiver according to claim 6, wherein the zero intermediate frequency signal processing section includes:
a first low-pass filter that passes frequency components not higher than the frequency of the selected wave frequency band including the demodulated signal of the intermediate frequency signal, and generates the demodulated signal;
a complex multiplier that shifts a frequency spectrum of the intermediate frequency signal to a lower frequency side or a higher frequency side by the predetermined frequency; and
a second low-pass filter that passes frequency components of the intermediate frequency signal that are subjected to frequency spectrum shift by the complex multiplier and not higher than the predetermined frequency.

8. The radio receiver according to claim 7, wherein, in the zero intermediate frequency mode, the mode control section selects the zero intermediate frequency mode or the low intermediate frequency mode in accordance with a signal level of the intermediate frequency signal, a signal level of the demodulated signal outputted from the first low-pass filter, and a signal level of a signal outputted from the second low-pass filter.

9. The radio receiver according to claim 6, wherein the low intermediate frequency signal processing section includes:
a complex multiplier that shifts a frequency spectrum of the intermediate frequency signal to a lower frequency side by the intermediate frequency;
a third low-pass filter that passes frequency components not higher than the frequency of the selected wave frequency band including the demodulated signal of the intermediate frequency signal that subjected to frequency spectrum shift by the complex multiplier, and generates the demodulated signal, and generates the demodulated signal; and
a band-pass filter that attenuates frequency components outside a frequency band different from the selected wave frequency band of the intermediate frequency signal, and passes frequency components in the frequency band different from the selected wave frequency band of the intermediate frequency signal.

10. The radio receiver according to claim 9, wherein, in the zero intermediate frequency mode, the mode control section selects the zero intermediate frequency mode or the low intermediate frequency mode in accordance with a signal level of the intermediate frequency signal, a signal level of the demodulated signal outputted from the third low-pass filter, and a signal level of a signal outputted from the band-pass filter.

11. The radio receiver according to claim 1, wherein the received signal processing section includes:
a first digital filter that passes frequency components not higher than a frequency of a selected wave frequency band including the demodulated signal and generates the demodulated signal;
a second digital filter that passes the frequency components not higher than the predetermined frequency;
a complex multiplier that shifts a frequency spectrum of the intermediate frequency signal to a lower frequency side or a higher frequency side by the predetermined frequency; and
a path selector switch that changes a signal path of the intermediate frequency signal;
wherein, when the zero intermediate frequency mode is to be selected as an operating mode of the quadrature demodulator, the mode control section controls the path selector switch in such a manner that an intermediate frequency signal converted to a digital signal by the analog-to-digital converter is inputted to the first digital filter and to the complex multiplier, and that an output of the complex multiplier is inputted to the second digital filter; and
wherein, when the low intermediate frequency mode is to be selected as the operating mode of the quadrature demodulator, the mode control section controls the path selector switch in such a manner that an intermediate frequency signal converted to a digital signal by the analog-to-digital converter is inputted to the complex multiplier through the second digital filter, and that the output of the complex multiplier is inputted to the first digital filter.

12. A radio receiver, comprising:
an oscillator that has a variable oscillation frequency;
a quadrature demodulator that includes a frequency mixer and generates an intermediate frequency signal having an intermediate frequency lower than the frequency of a radio frequency signal, the frequency mixer mixing a radio frequency signal with an oscillation signal outputted from the oscillator;
an analog filter that bandlimits the intermediate frequency signal;
an analog-to-digital converter that receives an intermediate frequency signal inputted through the analog filter and converts the received intermediate frequency signal to a digital signal;
a received signal processing section that generates a demodulated signal from the intermediate frequency signal converted to the digital signal; and
a mode control section that switches the operating mode of the quadrature demodulator between a zero intermediate frequency mode and a low intermediate frequency mode in accordance with radio wave reception conditions, the zero intermediate frequency mode providing the intermediate frequency signal having a zero intermediate frequency, the low intermediate frequency mode providing the intermediate frequency signal having a low intermediate frequency higher than the zero intermediate frequency,
wherein the radio frequency signal includes signals on a plurality of channels, wherein the radio receiver further comprises a channel scan section that scans the signal levels of radio frequency signals on the channels, and wherein the mode control section selects the zero intermediate frequency mode or the low intermediate frequency mode in accordance with the result of a channel scan performed by the channel scan section.

13. The radio receiver according to claim 12, wherein the mode control section selects the zero intermediate frequency mode or the low intermediate frequency mode in accordance with a signal level of a receiving channel corresponding to a selected wave frequency band, a signal level of an upper adjacent channel that has a frequency band higher than the selected wave frequency band and is adjacent to the receiving channel, and a signal level of a lower adjacent channel that has a frequency band lower than the selected wave frequency band and is adjacent to the receiving channel.

14. The radio receiver according to claim 1, further comprising:
   a first level detector that detects a signal level of the intermediate frequency signal converted to the digital signal;
   a second level detector that detects a signal level of a frequency band different from a selected wave frequency band including the demodulated signal of the intermediate frequency signal converted to the digital signal; and
   a third level detector that detects a signal level of the selected wave frequency band of the intermediate frequency signal converted to the digital signal;
   wherein the mode control section selects the zero intermediate frequency mode or the low intermediate frequency mode in accordance with the signal levels detected by the first level detector, the second level detector, and the third level detector.

15. The radio receiver according to claim 14, wherein the second level detector detects a signal level of a predetermined frequency band including an upper adjacent frequency band or a lower adjacent frequency band, the upper adjacent frequency band being higher than and adjacent to the selected wave frequency band of the intermediate frequency signal converted to the digital signal, the lower adjacent frequency band being lower than and adjacent to the selected wave frequency band of the intermediate frequency signal converted to the digital signal.

16. The radio receiver according to claim 14, further comprising:
   a fourth level detector that detects a signal level of the radio frequency signal,
   wherein, in the zero intermediate frequency mode, the mode control section determines a ratio between the signal level detected by the fourth level detector and the signal level detected by the third level detector, and if the determined ratio is higher than a predetermined threshold value, changes an operating mode of the quadrature demodulator to the low intermediate frequency mode.

17. The radio receiver according to claim 16, wherein, in the zero intermediate frequency mode, the mode control section stops an operation of the first level detector and an operation of the second level detector, and in the low intermediate frequency mode, the mode control section stops an operation of the fourth level detector.

18. The radio receiver according to claim 1, wherein, when the zero intermediate frequency mode is selected as an operating mode of the quadrature demodulator, the mode control section makes a band of the analog-to-digital converter narrower than in the low intermediate frequency mode.

19. The radio receiver according to claim 1, wherein the analog filter is able to switch between a low-pass filter and a band-pass filter, and
   wherein the mode control section allows the analog filter to function as a low-pass filter in the zero intermediate frequency mode, and allows the analog filter to function as a band-pass filter in the low intermediate frequency mode.

20. An intermediate frequency selection method, comprising:
   receiving a radio frequency signal;
   converting, by a quadrature demodulator, the received radio frequency signal to an intermediate frequency signal;
   converting the intermediate frequency signal to a digital signal;
   generating a demodulated signal from the intermediate frequency signal converted to the digital signal; and
   exercising control in accordance with radio wave reception conditions so as to maintain the intermediate frequency signal at a zero intermediate frequency or at a low intermediate frequency, the low intermediate frequency being higher than the zero intermediate frequency,
   wherein, in the zero intermediate frequency mode, frequency components of the intermediate frequency signal that are not higher than a predetermined frequency are passed, and in the low intermediate frequency mode, signal components of the intermediate frequency signal that have a frequency band including a frequency of the intermediate frequency signal are passed.

* * * * *